(12) United States Patent
Maskatia et al.

(10) Patent No.: US 9,348,822 B2
(45) Date of Patent: May 24, 2016

(54) SYSTEM AND METHOD FOR GENERATING NOTIFICATIONS RELATED TO NEW MEDIA

(75) Inventors: Imran Maskatia, Milpitas, CA (US); Jason Rubinstein, Lake Forest, IL (US)

(73) Assignee: Redbox Automated Retail, LLC, Oakbrook Terrace, IL (US)

(*) Notice: Subject to any disclaimer, the term of this patent is extended or adjusted under 35 U.S.C. 154(b) by 383 days.

(21) Appl. No.: 13/563,654

(22) Filed: Jul. 31, 2012

(65) Prior Publication Data

US 2013/0080415 A1 Mar. 28, 2013

Related U.S. Application Data

(60) Provisional application No. 61/514,448, filed on Aug. 2, 2011.

(51) Int. Cl.
*G06F 7/00* (2006.01)
*G06F 17/30* (2006.01)
*G06Q 30/02* (2012.01)

(52) U.S. Cl.
CPC .......... *G06F 17/30029* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 2,098,697 A | 11/1937 | Vanderput | |
| 3,267,436 A | 8/1966 | Alpert et al. | |
| 3,379,295 A | 4/1968 | Varley | |
| 3,529,155 A | 9/1970 | Hansen | |
| 3,622,995 A | 11/1971 | Dilks et al. | |
| 3,648,241 A | 3/1972 | Naito et al. | |
| 3,824,544 A | 7/1974 | Simjian | |
| 3,826,344 A | 7/1974 | Wahlberg | |
| 3,831,807 A | 8/1974 | Deaton et al. | |
| 3,946,220 A | 3/1976 | Brobeck et al. | |
| 3,964,577 A | 6/1976 | Bengtsson | |
| 4,043,483 A | 8/1977 | Gore et al. | |
| 4,073,368 A | 2/1978 | Mustapick | |
| 4,300,040 A | 11/1981 | Gould et al. | |

(Continued)

FOREIGN PATENT DOCUMENTS

| | | |
|---|---|---|
| CA | 2302753 | 5/1999 |
| CA | 1236546 | 1/2000 |

(Continued)

OTHER PUBLICATIONS

Patent Cooperation Treaty International Search Report for Application PCT/US2005/12563 mailed Aug. 10, 2005.

(Continued)

*Primary Examiner* — Robert Beausoliel, Jr.
*Assistant Examiner* — Michael Pham
(74) *Attorney, Agent, or Firm* — James P. Muraff; Neal, Gerber & Eisenberg LLP

(57) ABSTRACT

A method of generating notifications related to availability of new media content is provided. The method includes receiving a notification subscription including a request to monitor for new media content. The method also includes detecting new media content based on the subscription, and if a change is detected, determining an access right and transmitting a notification of the new media content. The metadata of the new media content is used in the subscriptions to determine when to generate notifications. Media content may include media articles, media selections, theatrical media releases, live content, or miscellaneous media sources.

34 Claims, 13 Drawing Sheets

(56) References Cited

U.S. PATENT DOCUMENTS

| | | |
|---|---|---|
| 4,306,219 A | 12/1981 | Main et al. |
| 4,348,551 A | 9/1982 | Nakatani et al. |
| 4,369,422 A | 1/1983 | Rasmussen et al. |
| 4,369,442 A | 1/1983 | Werth et al. |
| 4,385,366 A | 5/1983 | Housey, Jr. |
| 4,388,689 A | 6/1983 | Hayman et al. |
| 4,396,985 A | 8/1983 | Ohara et al. |
| 4,414,467 A | 11/1983 | Gould et al. |
| 4,415,065 A | 11/1983 | Sandstedt et al. |
| 4,449,186 A | 5/1984 | Kelly et al. |
| 4,458,802 A | 7/1984 | MacIver et al. |
| 4,519,522 A | 5/1985 | McElwee |
| 4,530,067 A | 7/1985 | Dorr et al. |
| 4,547,851 A | 10/1985 | Kurland et al. |
| 4,553,222 A | 11/1985 | Kurland et al. |
| 4,567,359 A | 1/1986 | Lockwood et al. |
| 4,569,421 A | 2/1986 | Sandstedt |
| RE32,115 E | 4/1986 | Lockwood et al. |
| 4,598,810 A | 7/1986 | Shore et al. |
| 4,649,481 A | 3/1987 | Takahashi et al. |
| 4,650,977 A | 3/1987 | Couch et al. |
| 4,668,150 A | 5/1987 | Blumberg |
| 4,669,596 A | 6/1987 | Capers et al. |
| 4,675,515 A | 6/1987 | Lucero et al. |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,766,548 A | 8/1988 | Cedrone et al. |
| 4,767,917 A | 8/1988 | Ushikubo et al. |
| 4,775,935 A | 10/1988 | Yourick |
| 4,778,983 A | 10/1988 | Ushikubo et al. |
| 4,789,045 A | 12/1988 | Pugh et al. |
| 4,789,054 A | 12/1988 | Shore et al. |
| 4,797,818 A | 1/1989 | Cotter |
| 4,812,629 A | 3/1989 | O'Neil et al. |
| 4,812,985 A | 3/1989 | Hambrick et al. |
| 4,814,592 A | 3/1989 | Bradt et al. |
| 4,814,985 A | 3/1989 | Swistak et al. |
| 4,821,917 A | 4/1989 | Brown |
| 4,825,045 A | 4/1989 | Humble et al. |
| 4,839,505 A | 6/1989 | Bradt et al. |
| 4,839,507 A | 6/1989 | May |
| 4,847,764 A | 7/1989 | Halvorson |
| 4,858,743 A | 8/1989 | Paraskevakos et al. |
| 4,860,876 A | 8/1989 | Moore et al. |
| 4,866,661 A | 9/1989 | De Prins et al. |
| 4,882,475 A | 11/1989 | Miller et al. |
| 4,893,705 A | 1/1990 | Brown |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| D308,052 S | 5/1990 | Darden et al. |
| 4,941,841 A | 7/1990 | Darden et al. |
| 4,945,428 A | 7/1990 | Waldo et al. |
| 4,947,028 A | 8/1990 | Gorog |
| 4,959,686 A | 9/1990 | Spallone et al. |
| 4,967,403 A | 10/1990 | Ogawa et al. |
| 4,967,906 A | 11/1990 | Morello et al. |
| 4,982,346 A | 1/1991 | Girouard et al. |
| 4,991,739 A | 2/1991 | Levasseur |
| 4,995,498 A | 2/1991 | Menke |
| 5,007,518 A | 4/1991 | Crooks et al. |
| 5,012,077 A | 4/1991 | Takano et al. |
| 5,013,897 A | 5/1991 | Harman et al. |
| 5,019,699 A | 5/1991 | Koenck et al. |
| 5,020,958 A | 6/1991 | Tuttobene et al. |
| 5,028,766 A | 7/1991 | Shah et al. |
| 5,042,686 A | 8/1991 | Stucki |
| 5,077,462 A | 12/1991 | Newell et al. |
| 5,077,607 A | 12/1991 | Johnson et al. |
| 5,085,308 A | 2/1992 | Wilhelm |
| 5,088,586 A | 2/1992 | Isobe et al. |
| 5,091,713 A | 2/1992 | Horne et al. |
| 5,095,195 A | 3/1992 | Harman et al. |
| 5,105,069 A | 4/1992 | Hakenewerth et al. |
| 5,128,862 A | 7/1992 | Mueller et al. |
| 5,133,441 A | 7/1992 | Brown |
| 5,139,384 A | 8/1992 | Tuttobene et al. |
| 5,143,193 A | 9/1992 | Geraci |
| 5,159,560 A | 10/1992 | Newell et al. |
| 5,205,436 A | 4/1993 | Savage |
| 5,206,814 A | 4/1993 | Cahlander et al. |
| 5,207,784 A | 5/1993 | Schwartzendruber et al. |
| 5,212,649 A | 5/1993 | Pelletier et al. |
| 5,235,509 A | 8/1993 | Mueller et al. |
| RE34,369 E | 9/1993 | Darden et al. |
| 5,273,183 A | 12/1993 | Tuttobene et al. |
| 5,313,392 A | 5/1994 | Temma et al. |
| 5,313,393 A | 5/1994 | Varley et al. |
| 5,319,705 A | 6/1994 | Halter |
| 5,323,327 A | 6/1994 | Carmichael et al. |
| 5,353,219 A | 10/1994 | Mueller et al. |
| 5,383,111 A | 1/1995 | Homma et al. |
| 5,385,265 A | 1/1995 | Schlamp et al. |
| 5,408,417 A | 4/1995 | Wilder |
| 5,409,092 A | 4/1995 | Itako et al. |
| 5,418,713 A | 5/1995 | Allen et al. |
| 5,442,568 A | 8/1995 | Ostendorf et al. |
| 5,445,295 A | 8/1995 | Brown et al. |
| 5,450,584 A | 9/1995 | Sekiguchi et al. |
| 5,450,938 A | 9/1995 | Rademacher et al. |
| 5,467,892 A | 11/1995 | Schlamp et al. |
| 5,482,139 A | 1/1996 | Rivalto et al. |
| 5,484,988 A | 1/1996 | Hills et al. |
| 5,499,707 A | 3/1996 | Steury |
| 5,504,675 A | 4/1996 | Cragun et al. |
| 5,510,979 A | 4/1996 | Moderi et al. |
| 5,513,116 A | 4/1996 | Buckley et al. |
| 5,546,316 A | 8/1996 | Buckley et al. |
| 5,550,746 A | 8/1996 | Jacobs |
| 5,555,143 A | 9/1996 | Hinnen et al. |
| 5,559,714 A | 9/1996 | Banks et al. |
| 5,561,604 A | 10/1996 | Buckley et al. |
| 5,576,951 A | 11/1996 | Lockwood |
| 5,594,791 A | 1/1997 | Szlam et al. |
| 5,615,123 A | 3/1997 | Davidson et al. |
| 5,632,681 A | 5/1997 | Bakoglu et al. |
| 5,633,839 A | 5/1997 | Alexander et al. |
| 5,637,845 A | 6/1997 | Kolls et al. |
| 5,644,727 A | 7/1997 | Atkins |
| 5,647,505 A | 7/1997 | Scott |
| 5,647,507 A | 7/1997 | Kasper |
| 5,682,276 A | 10/1997 | Hinnen et al. |
| 5,694,546 A | 12/1997 | Reisman |
| 5,699,262 A | 12/1997 | Lang et al. |
| 5,699,528 A | 12/1997 | Hogan et al. |
| 5,715,403 A | 2/1998 | Stefik et al. |
| 5,724,069 A | 3/1998 | Chen et al. |
| 5,724,521 A | 3/1998 | Dedrick et al. |
| 5,732,398 A | 3/1998 | Tagawa et al. |
| 5,734,150 A | 3/1998 | Brown et al. |
| 5,748,485 A | 5/1998 | Christiansen et al. |
| 5,754,850 A | 5/1998 | Janssen |
| 5,761,071 A | 6/1998 | Bernstein et al. |
| 5,765,142 A | 6/1998 | Allred et al. |
| 5,768,142 A | 6/1998 | Jacobs et al. |
| 5,769,269 A | 6/1998 | Peters et al. |
| 5,777,884 A | 7/1998 | Belka et al. |
| 5,790,677 A | 8/1998 | Fox et al. |
| 5,806,071 A | 9/1998 | Balderrama et al. |
| 5,822,216 A | 10/1998 | Satchell et al. |
| 5,822,291 A | 10/1998 | Brindze et al. |
| 5,831,862 A | 11/1998 | Hetrick et al. |
| 5,832,503 A | 11/1998 | Malik et al. |
| 5,850,442 A | 12/1998 | Muftic et al. |
| 5,870,716 A | 2/1999 | Sugiyama et al. |
| 5,873,069 A | 2/1999 | Reuhl et al. |
| 5,875,110 A | 2/1999 | Jacobs |
| 5,884,278 A | 3/1999 | Powell et al. |
| 5,898,594 A | 4/1999 | Leason et al. |
| 5,900,608 A | 5/1999 | Iida et al. |
| 5,905,246 A | 5/1999 | Fajkowski |

(56) References Cited

U.S. PATENT DOCUMENTS

| | | |
|---|---|---|
| 5,923,016 A | 7/1999 | Fredregill et al. |
| 5,930,771 A | 7/1999 | Stapp et al. |
| 5,934,439 A | 8/1999 | Kanoh et al. |
| 5,936,452 A | 8/1999 | Utsuno et al. |
| 5,938,510 A | 8/1999 | Takahashi et al. |
| 5,941,363 A | 8/1999 | Partyka et al. |
| 5,943,423 A | 8/1999 | Muftic et al. |
| 5,950,173 A | 9/1999 | Perkowski et al. |
| 5,954,797 A | 9/1999 | Sidey et al. |
| 5,956,694 A | 9/1999 | Powell et al. |
| 5,959,869 A | 9/1999 | Miller et al. |
| 5,963,134 A | 10/1999 | Bowers et al. |
| 5,963,452 A | 10/1999 | Etoh et al. |
| 5,984,509 A | 11/1999 | Scott et al. |
| 5,988,346 A | 11/1999 | Tedesco et al. |
| 5,988,431 A | 11/1999 | Roe |
| 5,997,170 A | 12/1999 | Brodbeck et al. |
| 6,002,395 A | 12/1999 | Wagner et al. |
| 6,014,137 A | 1/2000 | Burns et al. |
| 6,029,851 A | 2/2000 | Jenkins et al. |
| 6,039,244 A | 3/2000 | Finsterwald |
| 6,044,362 A | 3/2000 | Neely et al. |
| 6,047,338 A | 4/2000 | Grolemund et al. |
| 6,050,448 A | 4/2000 | Willis |
| 6,056,194 A | 5/2000 | Kolls et al. |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,848 A | 6/2000 | Bernstein et al. |
| 6,085,888 A | 7/2000 | Tedesco et al. |
| 6,101,483 A | 8/2000 | Petrovich et al. |
| 6,109,524 A | 8/2000 | Kanoh et al. |
| 6,115,649 A | 9/2000 | Sakata et al. |
| 6,119,934 A | 9/2000 | Kolls et al. |
| 6,123,223 A | 9/2000 | Watkins |
| 6,125,353 A | 9/2000 | Yagasaki |
| 6,126,036 A | 10/2000 | d'Alayer de Costemore d'Arc et al. |
| 6,134,547 A | 10/2000 | Huxley et al. |
| 6,138,911 A | 10/2000 | Fredregill et al. |
| 6,161,059 A | 12/2000 | Tedesco et al. |
| 6,164,528 A | 12/2000 | Hills et al. |
| 6,169,483 B1 | 1/2001 | Ghaffari et al. |
| 6,179,206 B1 | 1/2001 | Matsumori |
| 6,181,981 B1 | 1/2001 | Varga et al. |
| 6,182,857 B1 | 2/2001 | Hamm et al. |
| 6,195,661 B1 | 2/2001 | Filepp et al. |
| 6,199,141 B1 | 3/2001 | Weinreb et al. |
| 6,199,720 B1 | 3/2001 | Rudick et al. |
| 6,201,474 B1 | 3/2001 | Brady et al. |
| 6,202,006 B1 | 3/2001 | Scott |
| 6,209,322 B1 | 4/2001 | Yoshida et al. |
| 6,243,687 B1 | 6/2001 | Powell |
| 6,250,452 B1 | 6/2001 | Partyka et al. |
| 6,264,104 B1 | 7/2001 | Jenkins et al. |
| 6,269,285 B1 | 7/2001 | Mignault |
| 6,286,139 B1 | 9/2001 | Decinque |
| 6,289,322 B1 | 9/2001 | Kitchen et al. |
| 6,295,482 B1 | 9/2001 | Tognazzini |
| 6,298,972 B1 | 10/2001 | Tedesco et al. |
| 6,311,165 B1 | 10/2001 | Coutts et al. |
| 6,317,649 B1 | 11/2001 | Tedesco et al. |
| 6,321,985 B1 | 11/2001 | Kolls |
| 6,324,520 B1 | 11/2001 | Walker et al. |
| 6,327,230 B1 | 12/2001 | Miller et al. |
| 6,330,958 B1 | 12/2001 | Ruskin et al. |
| 6,334,110 B1 | 12/2001 | Walter et al. |
| 6,336,098 B1 | 1/2002 | Fortenberry et al. |
| 6,354,501 B1 | 3/2002 | Outwater et al. |
| 6,360,139 B1 | 3/2002 | Jacobs |
| 6,366,914 B1 | 4/2002 | Stern |
| 6,367,653 B1 | 4/2002 | Ruskin et al. |
| 6,367,696 B1 | 4/2002 | Inamitsu et al. |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,424,706 B1 | 7/2002 | Katz et al. |
| 6,430,470 B1 | 8/2002 | Nakajima et al. |
| 6,435,406 B1 | 8/2002 | Pentel |
| 6,456,981 B1 | 9/2002 | Dejaeger et al. |
| 6,457,038 B1 | 9/2002 | Defosse |
| 6,462,644 B1 | 10/2002 | Howell et al. |
| 6,466,658 B2 | 10/2002 | Schelberg, Jr. et al. |
| 6,466,830 B1 | 10/2002 | Manross |
| 6,477,503 B1 | 11/2002 | Mankes |
| 6,490,502 B2 | 12/2002 | Fellows et al. |
| 6,493,110 B1 | 12/2002 | Roberts |
| 6,522,772 B1 | 2/2003 | Morrison et al. |
| 6,527,176 B2 | 3/2003 | Baric |
| 6,539,282 B2 | 3/2003 | Metcalf et al. |
| 6,540,100 B2 | 4/2003 | Credle, Jr. et al. |
| 6,575,363 B1 | 6/2003 | Leason et al. |
| 6,584,309 B1 | 6/2003 | Whigham |
| 6,584,450 B1 | 6/2003 | Hastings et al. |
| 6,584,564 B2 | 6/2003 | Olkin et al. |
| 6,587,748 B2 | 7/2003 | Baack |
| 6,587,835 B1 | 7/2003 | Treyz et al. |
| 6,595,342 B1 | 7/2003 | Maritzen et al. |
| 6,606,602 B1 | 8/2003 | Kolls |
| 6,628,764 B1 | 9/2003 | Petite |
| 6,640,159 B2 | 10/2003 | Holmes et al. |
| 6,644,455 B2 | 11/2003 | Ichikawa |
| 6,644,495 B2 | 11/2003 | Ruskin et al. |
| 6,655,580 B1 | 12/2003 | Ergo et al. |
| 6,658,323 B2 | 12/2003 | Tedesco et al. |
| 6,688,523 B1 | 2/2004 | Koenck |
| 6,696,918 B2 | 2/2004 | Kucharczyk et al. |
| 6,707,380 B2 | 3/2004 | Maloney |
| 6,707,381 B1 | 3/2004 | Maloney |
| 6,708,879 B2 | 3/2004 | Hunt |
| 6,711,464 B1 | 3/2004 | Yap et al. |
| 6,711,465 B2 | 3/2004 | Tomassi |
| 6,715,403 B2 | 4/2004 | Hajek, Jr. et al. |
| 6,728,532 B1 | 4/2004 | Ahonen |
| 6,742,673 B2 | 6/2004 | Credle, Jr. et al. |
| 6,748,296 B2 | 6/2004 | Banerjee et al. |
| 6,748,539 B1 | 6/2004 | Lotspiech |
| 6,754,559 B2 | 6/2004 | Itako |
| 6,757,585 B2 | 6/2004 | Ohtsuki et al. |
| 6,792,334 B2 | 9/2004 | Metcalf et al. |
| 6,794,634 B2 | 9/2004 | Hair |
| 6,814,256 B2 | 11/2004 | Clark |
| 6,847,861 B2 | 1/2005 | Lunak et al. |
| 6,850,816 B2 | 2/2005 | Garratt |
| 6,851,092 B2 | 2/2005 | Chang et al. |
| 6,854,642 B2 | 2/2005 | Metcalf et al. |
| 6,923,371 B2 | 8/2005 | Goodfellow |
| 6,932,270 B1 | 8/2005 | Fajkowski |
| 6,954,732 B1 | 10/2005 | DeLapa et al. |
| 6,959,285 B2 | 10/2005 | Stefanik et al. |
| 6,959,286 B2 | 10/2005 | Perkowski |
| 6,965,869 B1 | 11/2005 | Tomita et al. |
| 6,968,365 B2 | 11/2005 | Hollstrom et al. |
| 6,970,837 B1 | 11/2005 | Walker et al. |
| 6,980,887 B2 | 12/2005 | Varga et al. |
| 6,985,607 B2 | 1/2006 | Alasia et al. |
| 7,024,381 B1 | 4/2006 | Hastings et al. |
| 7,024,390 B1 | 4/2006 | Mori et al. |
| 7,043,497 B1 | 5/2006 | Carty et al. |
| 7,053,773 B2 | 5/2006 | McGarry et al. |
| 7,058,581 B1 | 6/2006 | Young |
| 7,076,329 B1 | 7/2006 | Kolls |
| 7,079,230 B1 | 7/2006 | McInerney et al. |
| 7,079,822 B2 | 7/2006 | Gunji et al. |
| 7,079,922 B2 | 7/2006 | Komai |
| 7,085,556 B2 | 8/2006 | Offer |
| 7,085,727 B2 * | 8/2006 | VanOrman ............ 705/5 |
| 7,108,180 B2 | 9/2006 | Brusso et al. |
| 7,139,731 B1 | 11/2006 | Alvin |

(56) References Cited

U.S. PATENT DOCUMENTS

| | | |
|---|---|---|
| 7,167,842 B1 | 1/2007 | Josephson, II et al. |
| 7,167,892 B2 | 1/2007 | Defosse et al. |
| 7,174,317 B2 | 2/2007 | Phillips et al. |
| 7,191,952 B2 | 3/2007 | Blossom |
| 7,203,675 B1 | 4/2007 | Papierniak et al. |
| 7,209,893 B2 | 4/2007 | Nii |
| 7,233,916 B2 | 6/2007 | Schultz |
| 7,234,609 B2 | 6/2007 | DeLazzer et al. |
| 7,236,946 B2 | 6/2007 | Bates et al. |
| 7,240,805 B2 | 7/2007 | Chirnomas |
| 7,240,843 B2 | 7/2007 | Paul et al. |
| 7,315,629 B2 | 1/2008 | Alasia et al. |
| 7,347,359 B2 | 3/2008 | Boyes et al. |
| 7,350,230 B2 | 3/2008 | Forrest |
| 7,366,586 B2 | 4/2008 | Kaplan et al. |
| 7,389,243 B2 | 6/2008 | Gross |
| 7,406,693 B1 | 7/2008 | Goodwin, III |
| 7,412,073 B2 | 8/2008 | Alasia et al. |
| 7,444,296 B1 | 10/2008 | Barber et al. |
| 7,447,605 B2 | 11/2008 | Kuehnrich |
| 7,499,768 B2 | 3/2009 | Hoersten et al. |
| 7,584,869 B2 * | 9/2009 | DeLazzer et al. ............ 221/197 |
| 7,747,346 B2 | 6/2010 | Lowe et al. |
| 7,774,233 B2 | 8/2010 | Barber et al. |
| 7,787,987 B2 | 8/2010 | Kuehnrich et al. |
| 7,797,077 B2 | 9/2010 | Hale |
| 7,853,354 B2 | 12/2010 | Kuehnrich et al. |
| 7,853,600 B2 | 12/2010 | Herz et al. |
| 7,860,606 B2 | 12/2010 | Rudy |
| 7,988,049 B2 | 8/2011 | Kuehnrich |
| 8,060,247 B2 * | 11/2011 | Kaplan et al. ................. 700/240 |
| 8,060,249 B2 | 11/2011 | Bear et al. |
| 8,140,407 B2 * | 3/2012 | Ivory et al. ................... 705/26.8 |
| 8,235,247 B2 | 8/2012 | Alvarez |
| 8,352,449 B1 | 1/2013 | Parekh et al. |
| 8,626,614 B2 * | 1/2014 | Barber et al. ................... 705/28 |
| 2001/0011252 A1 | 8/2001 | Kasahara |
| 2001/0011680 A1 | 8/2001 | Soltesz et al. |
| 2001/0027357 A1 | 10/2001 | Grobler |
| 2001/0035425 A1 | 11/2001 | Rocco et al. |
| 2001/0037207 A1 | 11/2001 | Dejaeger |
| 2001/0047223 A1 | 11/2001 | Metcalf et al. |
| 2002/0029196 A1 | 3/2002 | Metcalf et al. |
| 2002/0046122 A1 | 4/2002 | Barber et al. |
| 2002/0046123 A1 | 4/2002 | Nicolini |
| 2002/0065579 A1 | 5/2002 | Tedesco et al. |
| 2002/0074397 A1 | 6/2002 | Matthews |
| 2002/0082917 A1 | 6/2002 | Takano |
| 2002/0084322 A1 | 7/2002 | Baric |
| 2002/0087334 A1 | 7/2002 | Yamaguchi et al. |
| 2002/0095680 A1 | 7/2002 | Davidson |
| 2002/0125314 A1 | 9/2002 | Jenkins et al. |
| 2002/0133269 A1 | 9/2002 | Anselmi |
| 2002/0161475 A1 | 10/2002 | Varga et al. |
| 2002/0165787 A1 | 11/2002 | Bates et al. |
| 2002/0165788 A1 | 11/2002 | Bates et al. |
| 2002/0165821 A1 | 11/2002 | Tree |
| 2002/0169715 A1 | 11/2002 | Ruth et al. |
| 2002/0183882 A1 | 12/2002 | Dearing et al. |
| 2002/0195491 A1 | 12/2002 | Bunch, III |
| 2003/0004828 A1 | 1/2003 | Epstein |
| 2003/0009408 A1 | 1/2003 | Korin |
| 2003/0023453 A1 | 1/2003 | Hafen et al. |
| 2003/0033054 A1 | 2/2003 | Yamazaki |
| 2003/0057219 A1 | 3/2003 | Risolia |
| 2003/0061094 A1 | 3/2003 | Banerjee et al. |
| 2003/0105554 A1 | 6/2003 | Eggenberger et al. |
| 2003/0125961 A1 | 7/2003 | Janda |
| 2003/0130762 A1 | 7/2003 | Tomassi |
| 2003/0149510 A1 | 8/2003 | Takahashi |
| 2003/0163382 A1 | 8/2003 | Stefanik et al. |
| 2003/0163399 A1 | 8/2003 | Harper et al. |
| 2003/0167231 A1 | 9/2003 | Winking et al. |
| 2003/0212471 A1 | 11/2003 | Chakravarti |
| 2004/0006537 A1 | 1/2004 | Zelechoski et al. |
| 2004/0010340 A1 | 1/2004 | Guindulain Vidondo |
| 2004/0016620 A1 | 1/2004 | Davis |
| 2004/0030446 A1 | 2/2004 | Guindulain Vidondo |
| 2004/0050648 A1 | 3/2004 | Carapelli |
| 2004/0064377 A1 | 4/2004 | Ergo et al. |
| 2004/0065579 A1 | 4/2004 | Wood |
| 2004/0068346 A1 | 4/2004 | Boucher |
| 2004/0068451 A1 | 4/2004 | Lenk et al. |
| 2004/0078328 A1 | 4/2004 | Talbert et al. |
| 2004/0079798 A1 * | 4/2004 | Messenger et al. ............ 235/381 |
| 2004/0133466 A1 | 7/2004 | Redmond et al. |
| 2004/0133653 A1 | 7/2004 | Defosse et al. |
| 2004/0139173 A1 | 7/2004 | Jeyhan et al. |
| 2004/0153413 A1 | 8/2004 | Gross |
| 2004/0158503 A1 * | 8/2004 | Gross .............................. 705/26 |
| 2004/0158504 A1 | 8/2004 | Gross |
| 2004/0158871 A1 | 8/2004 | Jacobson |
| 2004/0162633 A1 | 8/2004 | Kraft |
| 2004/0162783 A1 | 8/2004 | Gross |
| 2004/0172274 A1 | 9/2004 | Gross |
| 2004/0172275 A1 | 9/2004 | Gross |
| 2004/0172342 A1 | 9/2004 | Gross |
| 2004/0243479 A1 | 12/2004 | Gross |
| 2004/0243480 A1 | 12/2004 | Gross |
| 2004/0249711 A1 | 12/2004 | Walker et al. |
| 2004/0254676 A1 | 12/2004 | Blust et al. |
| 2004/0256402 A1 | 12/2004 | Chirnomas |
| 2004/0260600 A1 | 12/2004 | Gross |
| 2004/0267604 A1 | 12/2004 | Gross |
| 2004/0267640 A1 | 12/2004 | Bong et al. |
| 2005/0022239 A1 | 1/2005 | Meuleman |
| 2005/0027648 A1 | 2/2005 | Knowles et al. |
| 2005/0033855 A1 | 2/2005 | Moradi et al. |
| 2005/0060062 A1 | 3/2005 | Walker et al. |
| 2005/0060246 A1 | 3/2005 | Lastinger et al. |
| 2005/0080510 A1 | 4/2005 | Bates et al. |
| 2005/0085946 A1 | 4/2005 | Visikivi et al. |
| 2005/0086127 A1 | 4/2005 | Hastings et al. |
| 2005/0091069 A1 | 4/2005 | Chuang |
| 2005/0096936 A1 | 5/2005 | Lambers |
| 2005/0109836 A1 | 5/2005 | Ben-Aissa |
| 2005/0177494 A1 | 8/2005 | Kelly et al. |
| 2005/0197855 A1 | 9/2005 | Nudd |
| 2005/0216120 A1 | 9/2005 | Rosenberg |
| 2005/0230410 A1 | 10/2005 | DeLazzer et al. |
| 2005/0230473 A1 | 10/2005 | Fajkowski |
| 2005/0234911 A1 | 10/2005 | Hess et al. |
| 2005/0261977 A1 | 11/2005 | Kiji et al. |
| 2005/0267819 A1 | 12/2005 | Kaplan |
| 2005/0274793 A1 | 12/2005 | Cantini et al. |
| 2005/0283434 A1 | 12/2005 | Hahn-Carlson et al. |
| 2005/0289032 A1 | 12/2005 | Hoblit |
| 2006/0026031 A1 | 2/2006 | Gentling |
| 2006/0026162 A1 | 2/2006 | Salmonsen |
| 2006/0041508 A1 | 2/2006 | Pham et al. |
| 2006/0074777 A1 | 4/2006 | Anderson |
| 2006/0095286 A1 | 5/2006 | Kimura |
| 2006/0095339 A1 | 5/2006 | Hayashi et al. |
| 2006/0096997 A1 | 5/2006 | Yeo |
| 2006/0122881 A1 | 6/2006 | Walker et al. |
| 2006/0149685 A1 | 7/2006 | Gross |
| 2006/0155575 A1 | 7/2006 | Gross |
| 2006/0184395 A1 | 8/2006 | Millwee |
| 2006/0190345 A1 | 8/2006 | Crowley |
| 2006/0212360 A1 | 9/2006 | Stefanik et al. |
| 2006/0212367 A1 | 9/2006 | Gross |
| 2006/0231612 A1 | 10/2006 | Walker et al. |
| 2006/0231613 A1 | 10/2006 | Walker et al. |
| 2006/0231614 A1 | 10/2006 | Walker et al. |
| 2006/0235746 A1 | 10/2006 | Hammond et al. |
| 2006/0235747 A1 | 10/2006 | Hammond et al. |
| 2006/0241966 A1 | 10/2006 | Walker et al. |
| 2006/0241967 A1 | 10/2006 | Gross |
| 2006/0242059 A1 | 10/2006 | Hansen |
| 2006/0247823 A1 | 11/2006 | Boucher |
| 2006/0247824 A1 | 11/2006 | Walker et al. |
| 2006/0254832 A1 | 11/2006 | Strong |
| 2006/0254862 A1 | 11/2006 | Hoersten et al. |
| 2006/0259190 A1 | 11/2006 | Hale |

(56) References Cited

U.S. PATENT DOCUMENTS

| | | |
|---|---|---|
| 2006/0259191 A1* | 11/2006 | Lowe .................. 700/234 |
| 2006/0259192 A1 | 11/2006 | Lowe et al. |
| 2006/0265101 A1 | 11/2006 | Kaplan et al. |
| 2006/0265286 A1 | 11/2006 | Evangelist et al. |
| 2006/0266823 A1 | 11/2006 | Passen et al. |
| 2006/0272922 A1 | 12/2006 | Hoersten et al. |
| 2006/0273152 A1 | 12/2006 | Fields |
| 2007/0005438 A1 | 1/2007 | Evangelist et al. |
| 2007/0011093 A1 | 1/2007 | Tree |
| 2007/0011903 A1 | 1/2007 | Chang |
| 2007/0050083 A1 | 3/2007 | Signorelli et al. |
| 2007/0050256 A1 | 3/2007 | Walker et al. |
| 2007/0050266 A1 | 3/2007 | Barber et al. |
| 2007/0051802 A1 | 3/2007 | Barber et al. |
| 2007/0063020 A1 | 3/2007 | Barrafato |
| 2007/0063027 A1 | 3/2007 | Belfer et al. |
| 2007/0067429 A1 | 3/2007 | Jain et al. |
| 2007/0084872 A1 | 4/2007 | Hair et al. |
| 2007/0084917 A1 | 4/2007 | Fajkowski |
| 2007/0094245 A1 | 4/2007 | Vigil |
| 2007/0095901 A1 | 5/2007 | Illingworth |
| 2007/0125104 A1 | 6/2007 | Ehlers |
| 2007/0130020 A1 | 6/2007 | Paolini |
| 2007/0136247 A1 | 6/2007 | Vigil |
| 2007/0156442 A1 | 7/2007 | Ali |
| 2007/0156578 A1 | 7/2007 | Perazolo |
| 2007/0162183 A1 | 7/2007 | Pinney et al. |
| 2007/0162184 A1 | 7/2007 | Pinney et al. |
| 2007/0169132 A1 | 7/2007 | Blust et al. |
| 2007/0175986 A1 | 8/2007 | Petrone et al. |
| 2007/0179668 A1 | 8/2007 | Mellin |
| 2007/0185776 A1 | 8/2007 | Nguyen et al. |
| 2007/0210153 A1 | 9/2007 | Walker et al. |
| 2007/0213871 A1 | 9/2007 | Whitten et al. |
| 2007/0276537 A1 | 11/2007 | Walker et al. |
| 2008/0005025 A1 | 1/2008 | Legere et al. |
| 2008/0027835 A1 | 1/2008 | LeMasters et al. |
| 2008/0040211 A1 | 2/2008 | Walker et al. |
| 2008/0125906 A1 | 5/2008 | Bates et al. |
| 2008/0168515 A1* | 7/2008 | Benson et al. .............. 725/110 |
| 2008/0222690 A1 | 9/2008 | Kim |
| 2008/0239961 A1 | 10/2008 | Hilerio et al. |
| 2008/0275591 A1 | 11/2008 | Chirnomas |
| 2009/0018792 A1 | 1/2009 | Kuehnrich |
| 2009/0030931 A1 | 1/2009 | Khivesara et al. |
| 2009/0048932 A1 | 2/2009 | Barber |
| 2009/0089187 A1* | 4/2009 | Hoersten et al. .............. 705/28 |
| 2009/0113116 A1 | 4/2009 | Thompson et al. |
| 2009/0299824 A1 | 12/2009 | Barnes, Jr. |
| 2010/0010964 A1 | 1/2010 | Skowronek et al. |
| 2010/0036808 A1 | 2/2010 | Lee |
| 2010/0042577 A1 | 2/2010 | Rinearson |
| 2010/0057871 A1* | 3/2010 | Kaplan et al. .............. 709/206 |
| 2010/0093324 A1 | 4/2010 | Gupta et al. |
| 2010/0153983 A1 | 6/2010 | Philmon et al. |
| 2010/0198400 A1 | 8/2010 | Pascal et al. |
| 2010/0274624 A1 | 10/2010 | Rochford et al. |
| 2010/0275233 A1* | 10/2010 | Soohoo et al. .............. 725/46 |
| 2010/0312380 A1 | 12/2010 | Lowe et al. |
| 2010/0314405 A1 | 12/2010 | Alvarez |
| 2010/0318219 A1 | 12/2010 | Kuehnrich et al. |
| 2011/0004536 A1 | 1/2011 | Hoersten et al. |
| 2011/0047010 A1 | 2/2011 | Arnold et al. |
| 2011/0060454 A1 | 3/2011 | Lowe et al. |
| 2011/0060456 A1 | 3/2011 | Lowe et al. |
| 2011/0093329 A1 | 4/2011 | Bodor et al. |
| 2011/0103609 A1 | 5/2011 | Pelland et al. |
| 2011/0107374 A1 | 5/2011 | Roberts et al. |
| 2011/0130873 A1 | 6/2011 | Yepez et al. |
| 2011/0131652 A1 | 6/2011 | Robinson et al. |
| 2011/0145033 A1 | 6/2011 | Kuehnrich et al. |
| 2011/0153060 A1 | 6/2011 | Yepez et al. |
| 2011/0153067 A1 | 6/2011 | Weinshenker |
| 2011/0153071 A1 | 6/2011 | Claessen |
| 2011/0238194 A1 | 9/2011 | Rosenberg |
| 2011/0238296 A1 | 9/2011 | Purks et al. |
| 2012/0158708 A1* | 6/2012 | Gillet et al. .................. 707/723 |
| 2012/0311633 A1 | 12/2012 | Mandrekar et al. |
| 2013/0046707 A1 | 2/2013 | Maskatia et al. |
| 2013/0060648 A1 | 3/2013 | Maskatia et al. |

FOREIGN PATENT DOCUMENTS

| | | |
|---|---|---|
| DE | 35 29 155 | 2/1987 |
| EP | 0060643 | 9/1982 |
| EP | 205691 | 12/1986 |
| EP | 0249367 | 12/1987 |
| EP | 572119 | 12/1993 |
| EP | 287367 | 10/1998 |
| EP | 986033 | 3/2000 |
| EP | 1367549 | 12/2003 |
| FR | 2549624 | 1/1985 |
| FR | 2559599 | 8/1985 |
| FR | 2562293 | 10/1995 |
| GB | 380926 | 9/1932 |
| GB | 2143662 | 2/1985 |
| GB | 2172720 | 9/1986 |
| GB | 2402242 | 12/2004 |
| JP | 55156107 | 12/1980 |
| JP | 56047855 | 4/1981 |
| JP | 02178795 | 7/1990 |
| JP | 03062189 | 3/1991 |
| JP | 03119496 | 5/1991 |
| JP | 10247982 | 9/1998 |
| JP | 00149136 | 3/2000 |
| JP | 03036328 | 2/2003 |
| JP | 04094857 | 3/2004 |
| JP | 09043143 | 2/2009 |
| KR | 1020030089154 | 11/2003 |
| KR | 1020040069053 | 8/2004 |
| KR | 1020060080175 | 7/2006 |
| KR | 1020070021301 | 2/2007 |
| KR | 1020110036410 | 4/2011 |
| WO | WO 87/00948 | 2/1987 |
| WO | WO 87/05425 | 9/1987 |
| WO | WO 88/04085 | 6/1988 |
| WO | WO 88/06771 | 9/1988 |
| WO | WO 93/00644 | 1/1993 |
| WO | WO 99/24902 | 5/1999 |
| WO | WO 00/38120 | 6/2000 |
| WO | WO 00/72160 | 11/2000 |
| WO | WO 02/29708 | 4/2002 |
| WO | WO 2004/070646 | 8/2004 |
| WO | WO 2005/062887 | 7/2005 |
| WO | WO 2006/112817 | 10/2006 |
| WO | WO 2006/116108 | 11/2006 |
| WO | WO 2006/116109 | 11/2006 |
| WO | WO 2006/116110 | 11/2006 |
| WO | WO 2006/116112 | 11/2006 |
| WO | WO 2006/116113 | 11/2006 |
| WO | WO 2006/116114 | 11/2006 |
| WO | WO 2006/116115 | 11/2006 |
| WO | WO 2006/116116 | 11/2006 |
| WO | WO 2011/022689 | 2/2011 |
| WO | WO 2011/028727 | 3/2011 |
| WO | WO 2011/028728 | 3/2011 |
| WO | WO 2011/031532 | 3/2011 |

OTHER PUBLICATIONS

International Preliminary Report on Patentability for Application PCT/US2005/12563 dated Apr. 7, 20106.

Patent Cooperation Treaty International Search Report for Application PCT/US2006/15125 mailed Jan. 11, 2007.

International Preliminary Report on Patentability for Application PCT/US2006/15125 dated Jan. 11, 2007.

Patent Cooperation Treaty International Search Report for Application PCT/US2006/15131 mailed Jul. 7, 2008.

International Preliminary Report on Patentability for Application PCT/US2006/15131 dated Jun. 11, 2008.

Patent Cooperation Treaty International Search Report for Application PCT/US06/15130 mailed Nov. 22, 2006.

(56) References Cited

OTHER PUBLICATIONS

International Preliminary Report on Patentability for Application PCT/US06/15130 dated Apr. 23, 2007.
Patent Cooperation Treaty International Search Report for Application PCT/US06/15132 mailed May 10, 2007.
International Preliminary Report on Patentability for Application PCT/US06/15132 dated Nov. 17, 2007.
Patent Cooperation Treaty International Search Report for Application PCT/US06/15127 mailed Jun. 19, 2008.
International Preliminary Report on Patentability for Application PCT/US06/15127 dated Mar. 10, 2009.
Patent Cooperation Treaty International Search Report for Application PCT/US06/15129 mailed Sep. 20, 2006.
International Preliminary Report on Patentability for Application PCT/US06/15129 dated Oct. 23, 2007.
Patent Cooperation Treaty International Search Report for Application PCT/US06/15126 mailed Apr. 30, 2008.
International Preliminary Report on Patentability for Application PCT/US06/15126 dated Mar. 10, 2009.
Patent Cooperation Treaty International Search Report for Application PCT/US06/15133 mailed Jun. 6, 2007.
International Preliminary Report on Patentability for Application PCT/US06/15133 dated Oct. 23, 2007.
Patent Cooperation Treaty International Search Report for Application PCT/US2010/046872 mailed Mar. 29, 2011.
International Preliminary Report on Patentability for Application PCT/US2010/046872 dated Sep. 7, 2011.
Patent Cooperation Treaty International Search Report for Application US2010/046219 mailed Feb. 28, 2011.
International Preliminary Report on Patentability for Application US2010/046219 dated Feb. 21, 2012.
Patent Cooperation Treaty International Search Report for Application US2010/047374 mailed May 2, 2011.
International Preliminary Report on Patentability for Application US2010/047374 dated Mar. 6, 2012.
Patent Cooperation Treaty International Search Report for Application US2010/047371 mailed Apr. 29, 2011.
International Preliminary Report on Patentability for Application US2010/047371 dated Mar. 6, 2012.
Patent Cooperation Treaty International Search Report for Application US2012/024900 mailed Oct. 19, 2012.
International Preliminary Report on Patentability for Application US2012/024900 dated Aug. 21, 2013.
Patent Cooperation Treaty International Search Report for Application US2010/050339 mailed Feb. 29, 2012.
International Preliminary Report on Patentability for Application US2010/050339 dated Mar. 5, 2013.
Patent Cooperation Treaty International Search Report for Application US2011/48686 mailed Apr. 9, 2012.
International Preliminary Report on Patentability for Application US2011/48686 dated Feb. 28, 2013.
Patent Cooperation Treaty International Search Report for Application US2012/42329 mailed Feb. 22, 2013.
Supplementary Search Report mailed Jan. 21, 2009 for European Patent Application EP05736275.
Examination Report for EP 05736275.8 mailed May 15, 2009.
1982 Issue Rolling Stones Magazine, Film Rentals by Vending Machine.
1984 Picture of U.S. Installation of Japanese Manufactured VHS Rental Kiosk.
International Search Report and Written Opinion for PCT Application No. PCT/US12/49074 mailed Feb. 27, 2013.

* cited by examiner

1200

See What's Coming to Redbox

Don't miss any of these great new releases! Get email reminders on the day they come to redbox.

SYSTEM AND METHOD FOR GENERATING NOTIFICATIONS RELATED TO NEW MEDIA

CROSS-REFERENCE TO RELATED APPLICATIONS

This application claims priority to U.S. Provisional Application No. 61/514448, filed Aug. 2, 2011, entitled "SYSTEM AND METHOD FOR GENERATING NOTIFICATIONS RELATED TO NEW MEDIA", and is incorporated herein by reference in its entirety.

TECHNICAL FIELD

This invention relates to a system and method for generating notifications related to new media. More particularly, the present invention provides a system and method for monitoring changes related to new media content and generating notifications about the changes.

BACKGROUND AND SUMMARY OF THE INVENTION

While the present invention is often described herein with reference to a digital video disc, Blu-Ray disc, and video game distribution system, an application to which the present invention is advantageously suited, it will be readily apparent that the present invention is not limited to that application and can be employed in article dispensing systems used to distribute a wide variety of dispensable articles.

The digital video disc (DVD) player has been one of the most successful consumer electronics product launches in history. The market for DVD movie video, Blu-Ray movie video, and video game rentals is enormous and growing. Millions of households have acquired DVDs since they were introduced in 1997. In the first quarter of 2003 alone, it was estimated that well over three million DVD players were shipped to U.S. retailers.

In 2003, brick-and-mortar stores dominated the movie video and video game rental landscape in the U.S. Statistics showed that two brick-and-mortar companies controlled nearly sixty-five percent of the home video rental business. One element repeatedly cited for success of certain brick-and mortar store video rental franchises was perceived high availability of new video releases. Consumers want entertainment on demand, and through stocking multiple units of each new release, successful brick-and-mortar companies meet this consumer demand.

The foregoing indicates that there is a significant market potential for aligning regular routines of consumers (e.g., shopping, getting coffee or gas or going to a convenience store) with their DVD, Blu-Ray, and video game rental activities.

One improved article dispensing machine is disclosed in commonly owned U.S. Pat. No. 7,234,609, which is herein incorporated by reference in its entirety. The invention of the U.S. Pat. No. 7,234,609 and the present invention can function as an article dispensing machine-based distribution system that will typically have multiple units of each new release per article dispensing machine. The dispensing machines of the U.S. Pat. No. 7,234,609 and the present invention can stock up to two thousand DVDs, Blu-Ray, video games, or other discs (movies, games or other entertainment content), making the system competitive with existing brick-and-mortar video rental superstores.

The dispensing machine and system of the U.S. Pat. No. 7,234,609 and the present invention distinguishes itself from such stores by offering major benefits not conventionally offered by such stores, including additional cross-marketing programs (e.g., promotional rentals for a certain amount of dollars spent at the retail location) and convenience (e.g., open always).

The dispensing machine of the U.S. Pat. No. 7,234,609 and the present invention yields a competitive advantage in the DVD, Blu-Ray disc, and video game rental marketplace by offering consumers cross-marketing/promotional programs, convenience of selection (e.g., computer-based searches for movies and recommendations based on consumer profiles), and potentially extended hours. The present invention employs a more cost-effective, convenient platform than brick-and-mortar stores. In addition, with the present invention, dispensing machines can be situated in retail locations having high foot traffic, such as at a popular grocery store, restaurant, drug store, and/or other popular retail location.

The dispensing machine of the U.S. Pat. No. 7,234,609 and the present invention can be operated at a substantial savings over the costs associated with traditional brick-and-mortar video rental stores. For example, the present invention does not require hourly employees manning the dispensing machines or restocking them with inventories, due to the ability of the article transport storage units to be delivered to/picked up from retail locations by third-party delivery services, such as traditional or contracted courier services.

Unlike brick-and-mortar stores, the dispensing machine of the U.S. Pat. No. 7,234,609 and the present invention does not require an on-site store manager because all operational decisions can be made at a centralized location by a management team officed remote from the retail locations. Unlike brick-and-mortar stores, the dispensing machine of the U.S. Pat. No. 7,234,609 and the present invention does not require significant physical space. Unlike brick-and-mortar stores, the dispensing machine of the U.S. Pat. No. 7,234,609 and the present invention has low operating costs because no heating or air conditioning is required for the dispensing machines and they consume a relatively low level of electrical energy. In addition, the dispensing machine of the U.S. Pat. No. 7,234, 609 has low maintenance costs and downtime.

The dispensing machine of the U.S. Pat. No. 7,234,609 and the present invention addresses the shortcomings of traditional brick-and-mortar stores in a convenient and cost-effective delivery vehicle having the added bonus of serving as an effective promotional platform that drives incremental sales to retail locations. In addition, the dispensing machine of the U.S. Pat. No. 7,234,609 and the present invention overcomes these disadvantages by at least offering more new releases and older selections for any given time period, and lower cost per viewing with significantly more convenience than Internet-based and pay-per-view services.

The dispensing machine of the U.S. Pat. No. 7,234,609 and the present invention is a fully automated, integrated DVD, Blu-Ray, and video game rental and/or purchase systems. It preferably incorporates robust, secure, scalable software that provides a fully personalized user experience and real-time feedback to retail locations and advertisers, scalable hardware that leverages existing technologies such as touch screen, focused audio speakers and video monitors, technology utilizing the Internet through a system website or mobile/consumer electronics device application, and an article transport storage unit that facilitates the exchange of new discs for old discs in each machine with virtually no need for human intervention. These technologies and others fill long-felt needs in the art and give advantages over conventional video distribution options. The dispensing machine of the U.S. Pat.

No. 7,234,609 and the present invention functions as much as a promotional platform as it does a rental kiosk.

By utilizing the dispensing machines and the fully-interactive, real-time, linked Internet website or mobile/consumer electronics device application, consumers can rent one or more DVDs, Blu-Ray discs, video games, or other entertainment content directly from dispensing machines as well as indirectly by making a rental reservation through the website or application for later pickup at a conveniently located machine. These dispensing machines are preferably networked with each other, with the inventory control and/or supply office and with the system website or application by phone-line, DSL, wireless network, or other Internet connection at each retail location. Through this linked network, the rental experience for each consumer can be customized based on a profile for each consumer, such as via personalized home pages and rental screens.

Existing media notification systems allow users to receive notifications about the availability of media content in a single format and at a single point in time. For example, a user of existing media notification systems may receive a notification that the physical media article corresponding to a piece of media content is available to rent or purchase at a given time. Other existing media notification systems may notify a user that that a digital media selection for the piece of media content is available to view at another given time. However, these existing media notification systems do not notify users of the availability of the piece of media content in different formats at multiple points in time.

Notifications from existing media notification systems may include media content based directly on a preference, while some users may be interested in additional media content that is indirectly associated with the preference. Furthermore, the notifications from existing media notification systems may include media content that is only available to customers with certain subscription packages. In this case, a user may become frustrated when they attempt to access a particular piece of media content only to find that their subscription package does not allow access.

The present invention allows for generation of notifications related to the availability of media content in different formats, including physical media articles, digital media selections, and theatrical media releases. The present invention overcomes disadvantages of existing media notification systems by generating notifications regarding availability that include different formats of media content at different points in time. The present invention also allows for generation of notifications related to new media content that includes miscellaneous media sources as well as physical media articles, digital media selections, and theatrical media releases. Information related to inventory and subscription access may also be included in the notifications. A transaction offer may be included in the notifications to assist in increasing consumption of the media content. Other features and advantages are provided by the following description and drawings.

DETAILED DESCRIPTION OF THE INVENTION

Figure 1:
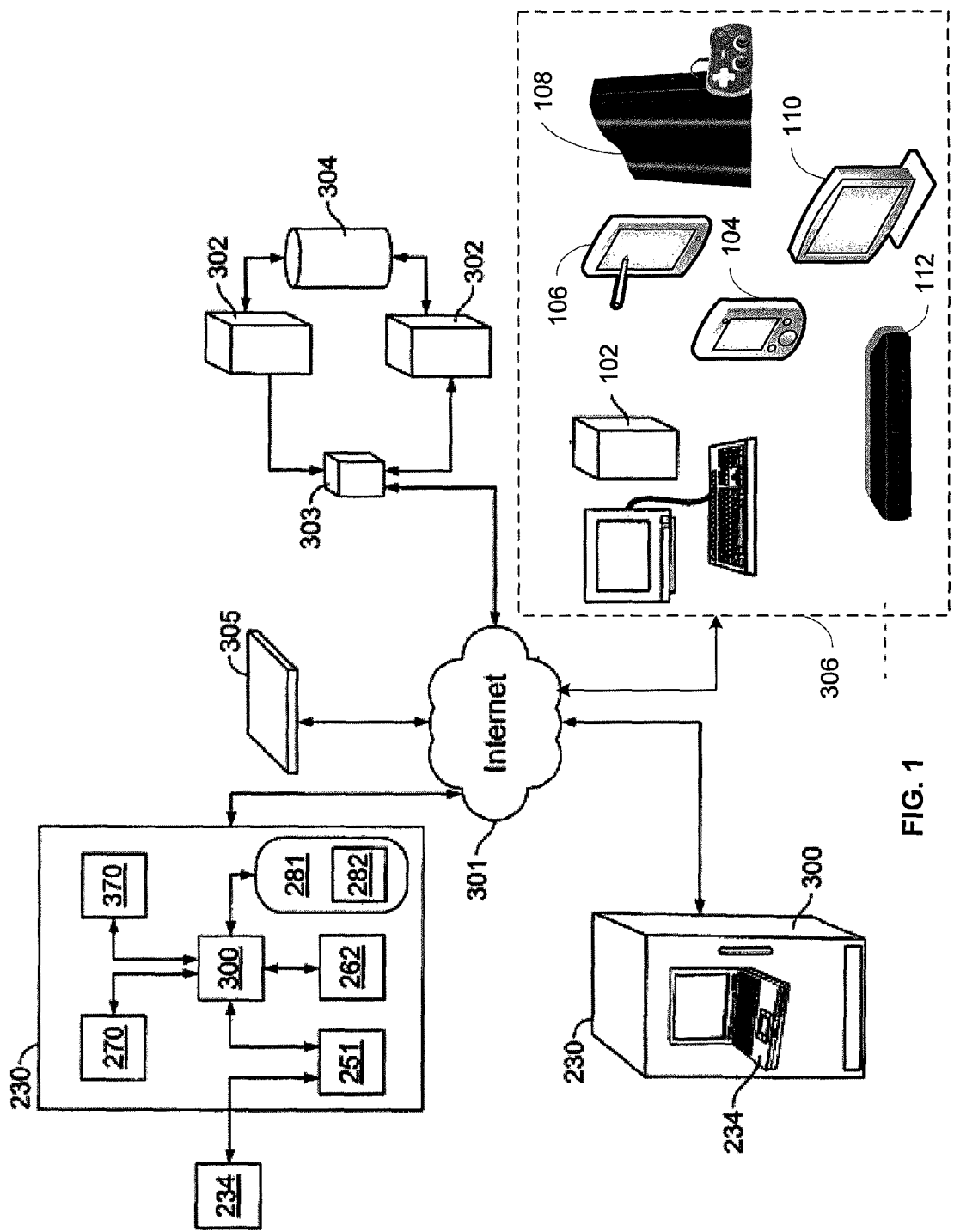
FIG. 1 is an illustration of a system for communicating and processing information in a network of article dispensing machines and dispensing apparatus.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 2:
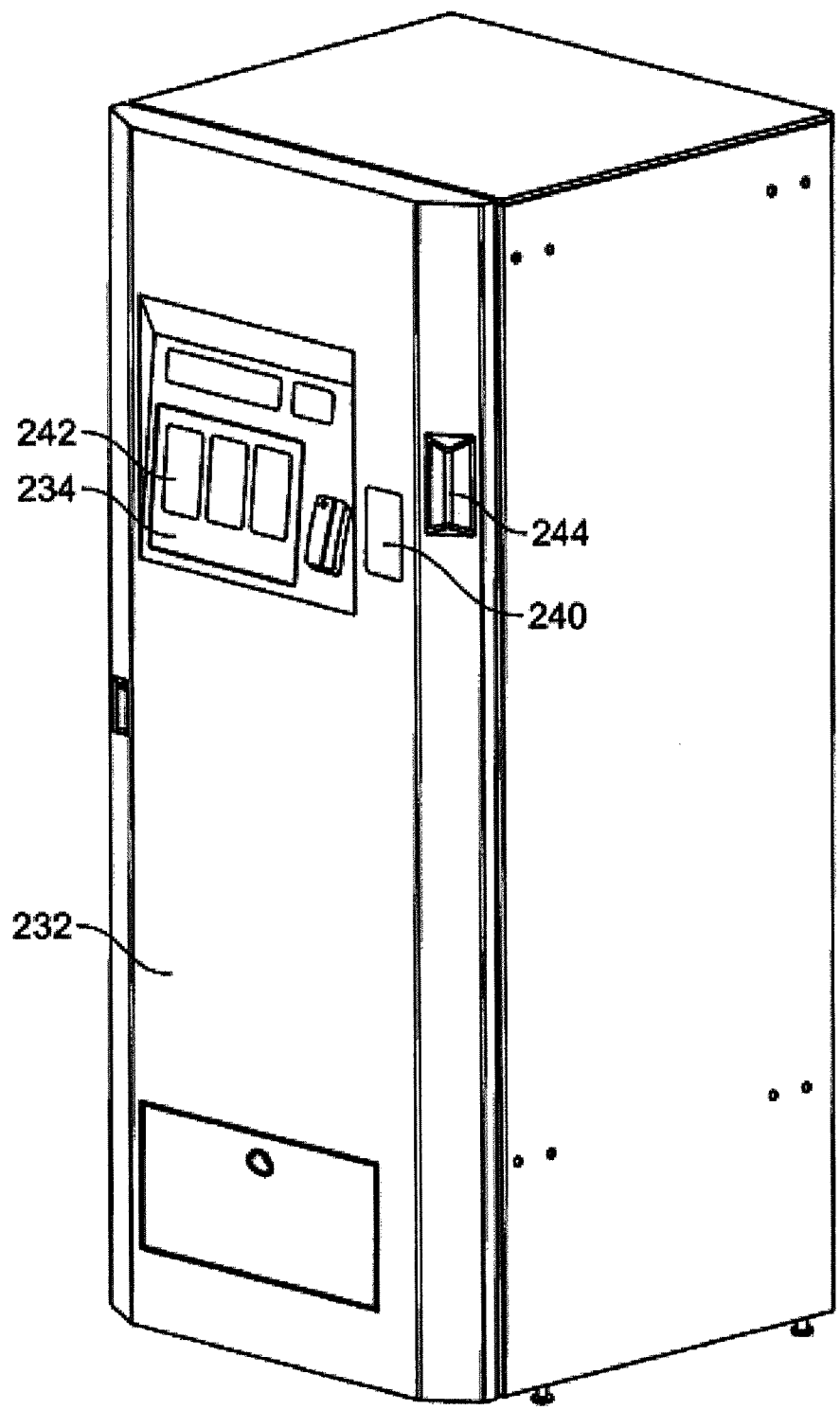
FIG. 2 is a perspective view of an article dispensing machine constructed in accordance with the principles of the present invention.

FIGS. 1-2 illustrate an article dispensing machine designated 230. Article dispensing machine 230 is one of a plurality of article dispensing machines included within an article distribution system having a plurality of such machines situated at a plurality of retail locations. The article dispensing machines of a particular article distribution system preferably form a network. As such, those machines are preferably in electrical communication with each other and with a central server or central controller.

As shown in FIG. 1, each article dispensing machine 230 includes a dispensing machine processor 300, also referred to herein as a vending controller, which is connected to a first sensor 270 and a second sensor 370, a first motor 251 and a second motor 262 and a user interface control system 234, collectively referred to as "the peripheral devices." The processor is capable of executing various programs to provide input to and/or receive outputs from the peripheral devices. Suitable processors for such use are known to those of skill in the art. In addition, the processor is operably connected to at least one memory storage device 281, such as a hard-drive or flash-drive or other suitable memory storage device.

Article dispensing machine memory storage device 281 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, article dispensing machine memory storage device 281 may incorporate electronic, magnetic, optical, and/or other types of storage media. Article dispensing machine memory storage device 281 can have a distributed architecture where various components are situated remote from one another, but are still accessed by processor. Article dispensing machine memory storage device includes an article dispensing machine database 282.

The article dispensing machines 230 preferably comprise a network of machines in communication with one another. As shown in FIG. 1, in the preferred configuration, the article dispensing machines 230 are networked with one another via a central server or central controller 302 in a hub-and-spoke system. However, optionally, the article dispensing machines may be connected and communicate directly with one another, and/or subsets of article dispensing machines may communicate with one another directly as well as with the central server 302.

Figure 3:
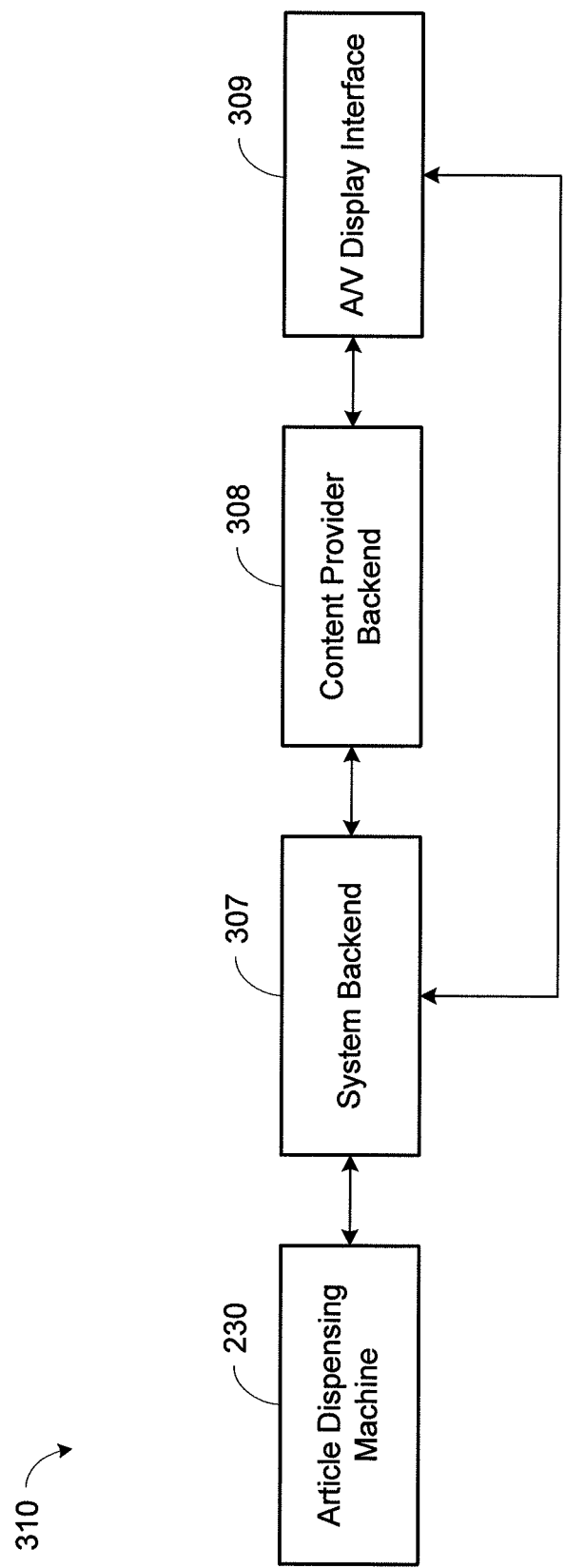
FIG. 3 is a high-level block diagram illustrating a networked media content system and connections including an article dispensing machine, a system backend, a content provider backend, and an A/V display interface.

Generally, in terms of hardware architecture, the central server 302 and the content provider backend 308 shown in FIG. 3 include a central processor and/or controller, central memory, and one or more input and/or output (I/O) devices (or peripherals) that are communicatively coupled via a local interface. The architecture of the central server 302 is set forth in greater detail in U.S. Pat. No. 7,234,609, the contents of which are incorporated herein by reference. Numerous variations of the architecture of the central server 302 and the content provider backend 308 would be understood by one of skill in the art and are encompassed within the scope of the present invention.

The processor/controller is a hardware device for executing software, particularly software stored in memory. The processor can be any custom made or commercially available processor, a central processing unit (CPU), an auxiliary processor among several processors associated with the server 302, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor may also represent a distributed processing architecture such as, but not limited to, SQL, Smalltalk, APL, KLisp, Snobol, Developer 200, MUMPS/Magic.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers, smartphones, or personal digital assistants (PDAs) (e.g., PalmOS available from Palm Computing, Inc., Windows CE or Windows Phone available from Microsoft Corporation, iOS available from Apple Inc, Android available from Google Inc., BlackBerry OS available from Research in Motion Limited, Symbian available from Nokia Corp.). The operating system essentially controls the execution of other computer programs and provides scheduling, input-output control, file and data management, memory management, and communication control and related services.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the operating system (O/S). Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, Ada, and Lua.

When article dispensing machine 230 is in operation, the article dispensing machine processor is configured to execute software stored within article dispensing machine memory, to communicate data to and from the dispensing machine memory, and to generally control operations of article dispensing machine pursuant to the software. The software aspects of the present invention and the O/S, in whole or in part, but typically the latter, are read by processor, perhaps buffered within the processor, and then executed.

When the present invention or aspects thereof are implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For communication with the central server 302, article dispensing machine 230 is equipped with network communication equipment and circuitry. In a preferred embodiment, the network communication equipment includes a network card such as an Ethernet card. In a preferred network environment, each of the plurality of article dispensing machines 230 on the network is configured to use the TCP/IP protocol to communicate via the network 301. It will be understood, however, that a variety of network protocols could also be employed, such as IPX/SPX, Netware, PPP and others. It will also be understood that while a preferred embodiment of the present invention is for article dispensing machine 230 to have a "broadband" connection to the network 301, the principles of the present invention are also practicable with a dialup connection using a standard modem. Wireless network connections are also contemplated, such as wireless Ethernet, satellite, infrared, radio frequency, Bluetooth, near field communication, and cellular networks.

The central controller 302 communicates with the article dispensing machine controllers 300 via the network 301. The central controller 302 is preferably located at a central station or office that is remote from the plurality of article dispensing machines 230. The central controller 302 can operate as the server for communicating over the network 301 between the plurality of article dispensing machines 230. The central controller 302 receives communications and information from the article dispensing machines 230, and also transmits communications and information to the machines 230. For example, when a rental transaction is performed at the article dispensing machine 230, transaction data such as the rented title is then transmitted from the machine 230 to the central controller 302 via the network 301. It will be understood that central servers in general, such as the central controller 302, are often distributed. A plurality of central servers/controllers 302 may optionally be arranged in "load balanced" architecture to improve the speed and efficiency of the network. To accomplish the implementation of multiple controllers 302, the controllers 302 may be in communication with a router/distributor 303.

The central controller 302 is also in communication with a central database 304. The central database 304 stores information regarding the transaction network. For example, the central database 304 stores data regarding the vending inventory at each of the plurality of article dispensing machines 230. The central database 304 also stores sales information regarding the sales quantities of the vending merchandise stored in the machines 230. For example, the central database 304 stores information regarding the sales totals for each title and for each machine 230 vending location. Central database 304 also stores user information and rental transaction information, such as user IDs, the date on which discs are due to be returned, the date on which discs were rented from the machines 230 and a list of valid coupon codes and restrictions associated with those codes. In certain embodiments, central database 304 also may be configured to store user PINs. Some of this information is also preferably stored in article dispensing machine database 282.

Central database 304 and databases in the content provider backend 308, such as the content provider customer profile database 502 and other databases, are preferably relational databases, although other types of database architectures may be used without departing from the principles of the present invention. For example, the databases 304 and 502 may be a SQL database, an Access database or an Oracle database, and in any such embodiment have the functionality stored herein. Central database 304 is also preferably capable of being shared, as illustrated, between a plurality of central controllers 302 and its information is also preferably capable of being transmitted via network 301. It will be understood that a variety of methods exist for serving the information stored in central database 304 and database 502. In one embodiment, .net and Microsoft Reporting Services are employed, however, other technologies such as ODBC, MySQL, CFML and the like may be used.

The central controller 302, central database 304, and components of the content provider backend 308 are also accessible by an electronic device 306, which may include a personal computer 102, mobile device 104 (e.g., smartphone, personal digital assistant, etc.), tablet computer 106, video game console 108, television 110, and Blu-Ray player 112. The electronic device 306 may be in direct or indirect communication with the central controller 302, central database 304, and/or the content provider backend 308 through a wired and/or wireless network connection, such as Ethernet, Wi-Fi, cellular (3G, 4G, etc.), or other type of connection. As a personal computer 102, the electronic device 306 will be understood as comprising hardware and software consistent with marketable personal and laptop computers, such as a display monitor, a keyboard, and a microprocessor. The electronic device 306 may also comprise Internet browser software such as Firefox, Internet Explorer, Chrome, or Safari. Using the browser software, a user of the electronic device 306 can access a web interface through the central controller 302. An application may also execute on the electronic device 306 that accesses the central controller 302. To that end, central controller 302 preferably comprises web server software such as IIS or Apache. It will be understood that a variety of web server software and web browser software exists to implement the principles of the present invention without departing therefrom. Through the web browser software or application, the electronic device 306 communicates with the central controller 302 and allows the user to login to a central command functionality of the central controller 302 and to view and modify data stored in the central database 304. The browser interface or application also allows the user to perform certain system functions, which will affect the inventory and behavior of the article dispensing machines 230. The electronic device 306 may communicate with the central controller 302, central database 304, components of the system backend 307, and components of the content provider backend 308 using rules and specifications of an application programming interface (API).

In a preferred embodiment, a financial server 305 is also in communication with the network 301. It will be understood that a variety of financial services exist for processing financial information via the Internet and other networks 301. Those services allow for the processing of credit card and debit card information, so that users of the services do not have to interface directly with credit and debit card companies. In FIG. 1, the financial server 305 is illustrated as a single server, although the financial server 305 may comprise an entire sub-network of financial servers 305 responsible for processing financial information.

As shown in FIG. 2, article dispensing machine 230 includes a machine housing 232 with front, rear, top, bottom and side panels. The machine housing 232 is preferably a combination molded fiberglass and sheet metal cabinet. However, those skilled in the art will appreciate that the housing can be constructed from a variety of other suitable materials and with a variety of other suitable manufacturing techniques.

As shown most clearly in FIG. 2, a user interface portion 234 of housing 232 includes a card reader 240, a keypad and/or touch screen 242 and an article transfer opening 244. The card reader 240 is preferably designed in known fashion to read magnetically encoded membership and/or credit/debit cards for authorizing the distribution of articles of inventory through the article transfer opening 244. Keypad and/or touch screen 242 permits consumers and/or inventory stocking personnel to communicate with the dispensing machine 230 and/or a central office linked in electrical communication with the dispensing machine. Keypad and/or touch screen 242 also permits consumers and/or inventory stocking personnel to enter appropriate commands directed to carrying out specific machine tasks. It will be appreciated that the optional touch screen includes a monitor made with known technologies making it capable of being utilized as a user interface for entry of commands designed to carry out machine tasks. The touch screen 242 may also be capable of displaying a QR (Quick Response) code to a customer. The customer may read the QR code with a camera on a mobile device or with a dedicated QR code reader. The QR code can represent a universal resource locator (URL) to access a digital media selection, for example.

Furthermore, it will be appreciated that additional user interface portions having additional or even identical user interface components could be incorporated within article dispensing machine 230. For example, these components could be incorporated on other panels of the housing 232 of machine 230 so that the machine can be used simultaneously by multiple consumers, translating into more efficient distribution of articles in high traffic areas. Dispensing machine 230 also preferably includes speaker units. Known audio technology may be incorporated within dispensing machine 230 to broadcast focused audio directed to relatively small (e.g., three square feet) locations in front of the machines from speaker units and/or in other designated locations at a retail site.

FIG. 3 illustrates a networked media content system 310 including an article dispensing machine 230, a system backend 307, a content provider backend 308, and an audio/visual (A/V) display interface 309. The networked media content system 310 provides for a variety of processes involving management, manipulation, searching, presentation, and notification related to digital media content, vendible physical media articles, theatrical media releases, live content, and miscellaneous media sources, including processes related to the present invention. The networked media content system 310 allows for direct and indirect communication between the components in the networked media content system 310 via one or more networks. The components in the networked media content system 310 may be operated by one or more entities. In one embodiment, the article dispensing machine(s) 230 and the system backend 307 are operated by a first entity, such as the operator of the article dispensing machines, while the content provider backend 308 and the A/V display interface 309 are operated by a second entity, such as a content provider. In another embodiment, all of the components shown in the networked media content system 310 of FIG. 3 are operated by the same entity. The physical media article may include at least a DVD, Blu-Ray disc, video game disc, or other media article including those that are out-of-stock or otherwise unavailable for rental. The digital media selections may include streaming video content, video-on-demand content, downloadable video content, streaming video games, downloadable video games, or other digital media content. Theatrical media releases may include theatrical films, theatrical film preview trailers, and other related media, and miscellaneous media sources may include live performances, television appearances, print media articles, internet postings, and other media sources. Live content may include television broadcasts and internet broadcasts. Although FIG. 3 shows a single content provider backend 308 and a single A/V display interface 309, it is contemplated that more than one content provider backend and/or A/V display interfaces may be in communication with the system backend 307.

The system backend 307 includes components that primarily communicate information, such as transaction and inventory data, to and from the article dispensing machines 230. Components in the system backend 307 also communicate information to and from the content provider backend 308 and the A/V display interface 309. The system backend 307 is detailed below with reference to FIG. 4. The content provider backend 308 includes components that primarily communicate information to and from the A/V display interface 309. Components in the content provider backend 308 also communicate information to and from the system backend 307, as detailed further below. Data communicated between the article dispensing machines 230, the system backend 307, the content provider backend 308, and/or the A/V display interface 309 may utilize the XML (Extensible Markup Language) format. The electronic device 306 and the A/V display interface 309 may communicate with the system backend 307 and/or the content provider backend 308 using rules and specifications of an application programming interface (API).

The A/V display interface 309 can be a set-top box, a module of an internet-ready television, a Blu-Ray player with internet connectability, a software application executing on a mobile device, cable television converter box, satellite television set-top box, IPTV (Internet Protocol television) set-top box (including AT&T U-Verse), digital video recorder, tablet computer, video game console (including Microsoft Xbox family, Sony PlayStation family, Nintendo Wii, and similar devices), handheld gaming device (including Sony PlayStation Portable, Nintendo DS, and similar devices), laptop computer, desktop computer, streaming media box (including Apple TV, Google TV, Roku, Boxee, and similar devices), or any other device capable of receiving and displaying streaming, on-demand, and/or downloadable electronic media from a content provider. Moreover, applications may be installed and executed on the A/V display interface 309 that communicate with the system backend 307 and/or the content provider backend 308 to provide media content and other information to a user of the A/V display interface 309.

The article dispensing machines 230 can communicate with the system backend 307, including the central server and controller 302, via network communication equipment and circuitry, as detailed above. Furthermore, the system backend 307 can communicate with the content provider backend 308 and the A/V display interface 309 via the same or different network communication equipment and circuitry. In particular, the system backend 307 can directly communicate with the content provider backend 308 and the A/V display interface 309, or in one embodiment, the system backend 307 can communicate with the A/V display interface 309 through the content provider backend 308. It will also be understood that while a preferred embodiment of the present invention is for the components of the system 310 to have a "broadband" connection with one another, the principles of the present invention are also practicable with a dialup connection using a standard modem. Wireless network connections are also contemplated, such as wireless Ethernet, satellite, infrared, radio frequency, Bluetooth, near field communication, and cellular networks.

Each of the article dispensing machines 230 may operate without requiring continuous connectivity and communication with the central controller 302. In one embodiment, the central controller 302 only transmits data in response to communication from an article dispensing machine 230. For example, an article dispensing machine 230 may attempt to communicate with the central controller 302 following completion of one or more rental transactions or one or more media article return transactions. In another embodiment, the article dispensing machine 230 continues normal operations and transactions even if communication is interrupted or cannot be established with the central controller 302. In these cases, transaction data can be stored locally in the article dispensing machine 230, such as in the article dispensing machine memory storage device 281, until a predetermined time interval elapses, when a predetermined number of transactions is reached, or until communication with the central controller 302 can be reestablished. Once communication is established with the central controller 302, financial and inventory information can be uploaded and the appropriate servers and databases can be updated.

In one embodiment, the article dispensing machine 230 can display only media articles which are physically located at the article dispensing machine 230. In this way, a customer may browse on the user interface 234 only the media articles which are in-stock and available to rent at that article dispensing machine 230. Typically, the article dispensing machine 230 possesses media information for the media articles that are currently located in the article dispensing machine 230. The media information for a media article includes title, actor, director, studio, publisher, plot synopsis, format, description, parental rating, individualized ratings and reviews, popularity, article type, running time, genre, cover artwork, or other information. The article dispensing machine 230 can also store in memory the media information for recently-rented media articles that are no longer physically stored in the article dispensing machine 230. The article dispensing machine 230 can communicate with the central controller 302 when media information about a particular media article is needed. For example, when a particular media article is returned to an article dispensing machine 230 that does not have the corresponding media information for that particular media article, the article dispensing machine 230 can query the central controller 302, metadata database 410, and/or inventory database 412 for the media information. Once the media information is obtained, the article dispensing machine 230 may display that particular media article on the user interface 234 as in-stock and available to rent.

In another embodiment, the article dispensing machine 230 can display media articles that are both physically located and not physically located at the article dispensing machine 230. In this embodiment, media articles which are both available and unavailable to rent can be displayed. A media article may be unavailable to rent if it is not in-stock or is in-stock but has been reserved for rental. In one example, the entire catalog of media articles stored in the inventory database 412 can be displayed on the article dispensing machine 230. In another example, a subset of the entire catalog of media articles can be displayed on the article dispensing machine 230. The subset of media articles that can be displayed on the article dispensing machine 230 may be determined, for example, based on geographic location, retailer agreements, contractual obligations, customer rental habits, and other criteria. The media articles that can be displayed on the article dispensing machine 230 may include recently-rented media articles that are no longer physically stored in the article dispensing machine 230 or media articles that have never been physically in the article dispensing machine 230. For example, media articles that have never been physically in the article dispensing machine 230 may be displayed because those media articles may be available at a nearby article dispensing machine. In this case, those media articles may be displayed to the customer so that the customer has an option to obtain those media articles from the nearby article dispensing machine 230. In this embodiment, if a customer attempts to rent a media article that is out-of-stock, reserved for another customer, or otherwise cannot be vended at the particular article dispensing machine 230, then that media article can be deemed an unavailable media article. Although a physical unavailable media article cannot be rented from the particular article dispensing machine 230, a digital alternative media selection may be available and substituted for the unavailable media article.

Figure 4:
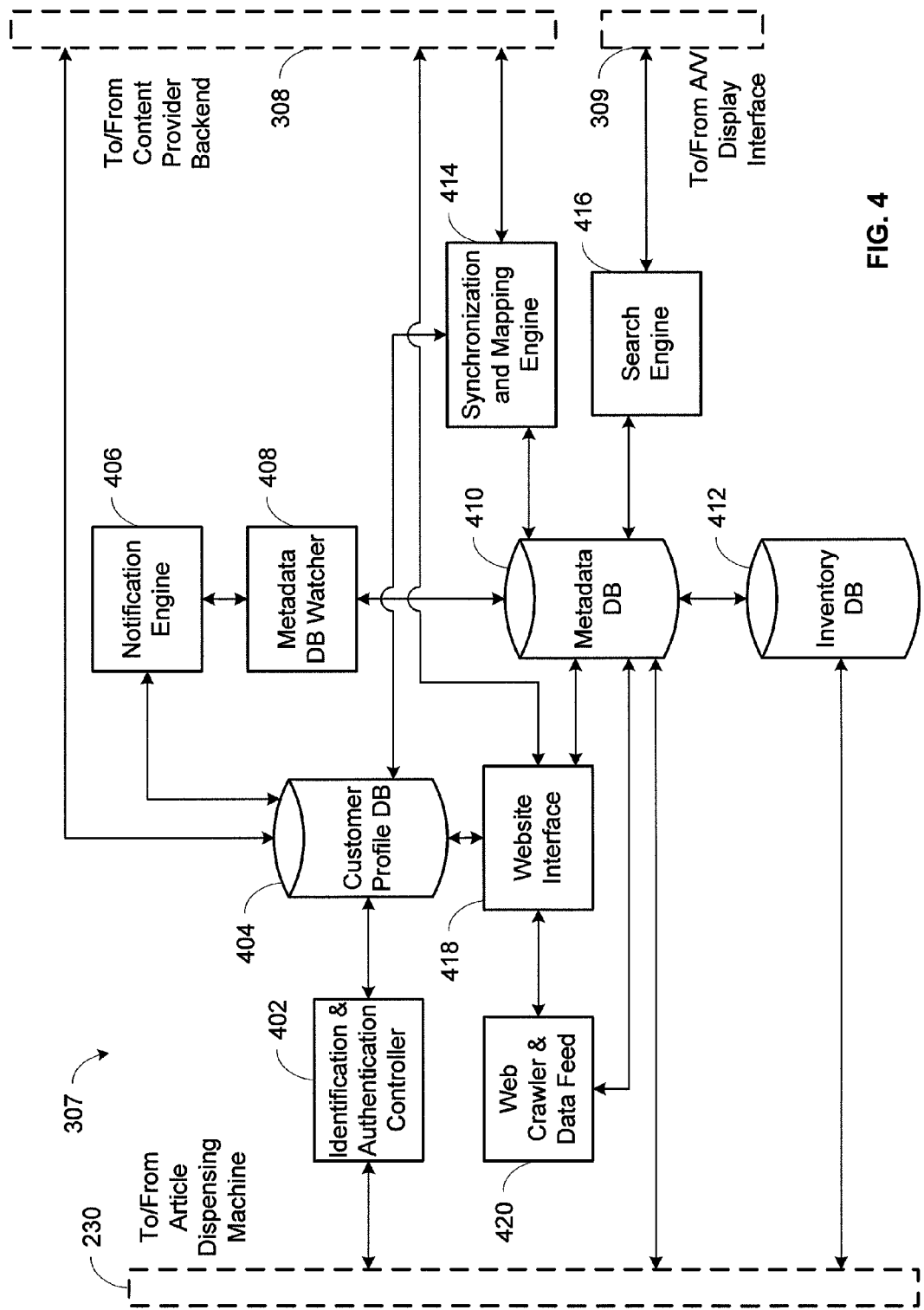
FIG. 4 is a block diagram illustrating the system backend.

FIG. 4 is a block diagram illustrating the system backend 307 and connections to and from the system backend 307 to the article dispensing machines 230, the content provider backend 308, and the A/V display interface 309. The system backend 307 includes components that provide and receive data to and from the article dispensing machines 230 during DVD, Blu-Ray disc, and video game rental transactions and other transactions. Components in the system backend 307 are utilized in relation to the present invention, as described below. It will be understood that components 402, 404, 406, 408, 414, 416, 418, and 420 in the system backend 307 may be implemented, for example, by the central controller 302 using instructions stored in a memory connected to the central controller 302. It will be further understood that the databases 404, 410, and 412 may be implemented as part of the central database 304 or as separate databases.

The identification and authentication controller 402 can receive a unique customer identifier that a customer provides to the article dispensing machines 230 during a rental transaction. The unique customer identifier can be a credit or debit card number, a hashed version of a credit or debit card number, or other unique identifier used for payment and/or identification purposes. In the case of hashing of the credit or debit card number, the hash function applied to the credit or debit card number is preferably implemented on the article dispensing machines 230 and may be, for example, a SHA-256 hashing algorithm. The identification and authentication controller 402 can validate the payment capability of a credit or debit card by communicating with the financial server 305.

Figure 5:
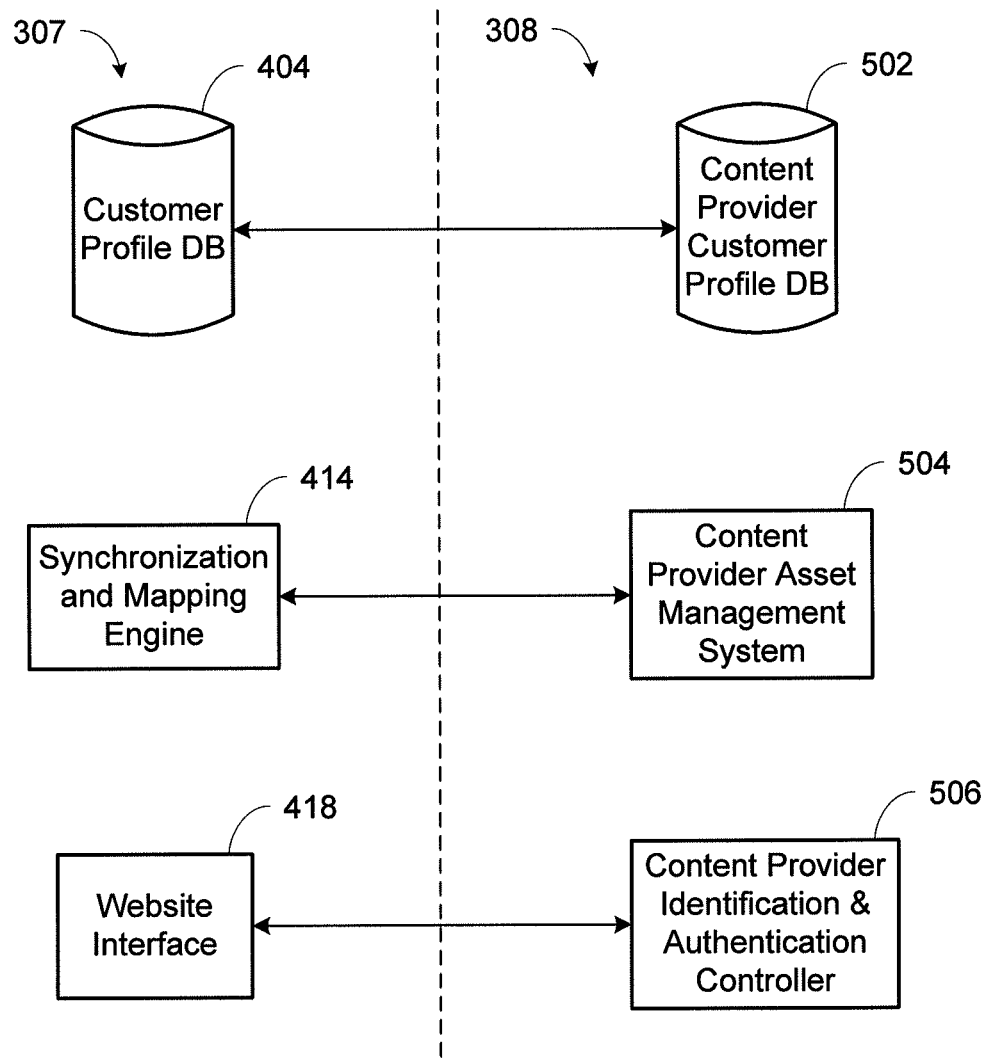
FIG. 5 is a block diagram illustrating connections between the system backend and the content provider backend.

A customer may be authenticated to multiple customer profiles and accounts by the identification and authentication controller 402. The unique customer identifier provided by the customer can authenticate the customer to an existing customer profile and account for the article dispensing machines 230. The existing customer profile and account can be stored and looked up using the unique customer identifier in the customer profile database 404 that is connected to the identification and authentication controller 402. The unique customer identifier can also link the existing customer account to a content provider customer account via a connection from the customer profile database 404 to the content provider customer profile database 502 in the content provider backend 308, as shown in FIG. 5. Zero, one, or more content provider customer accounts may be linked in the customer profile database 404 to the existing customer account for the article dispensing machines 230. A content provider may include, but is not limited to, a cable television operator, a satellite television service provider, an IPTV (Internet Protocol television) provider, an online gaming and digital media delivery service (Xbox Live, PlayStation Network, OnLive, etc.), a website (YouTube, Hulu, etc.), a movie studio, a television network, a game publisher, or a retailer (Best Buy, Walmart, etc.). Media selections available from a content provider may include videos on demand, streaming videos, downloadable videos, streaming video games, or downloadable video games. The media selections may be available through the A/V display interface 309 that is in communication with the content provider backend 308.

The customer profile database 404 can contain information related to customers of the article dispensing machines 230, including name, mailing and billing addresses, email addresses, phone and mobile numbers, username, password, payment methods, rental history, purchase history, preferred article dispensing machines, movie and video game genre preferences, customizations, subscriptions, parental controls, linked content provider accounts, content provider subscriptions and entitlements, and other data. A rental transaction can be personalized using information from the customer profile database 404 at the article dispensing machines 230 and a website interface 418. For example, only certain genres and titles of DVDs, Blu-Ray discs, or video games could be shown if a customer sets particular preferences that are then stored in the customer profile database 404. Some of the information stored in the customer profile database 404 may also be stored in the article dispensing machine database 282. The customer profile database 404 may include a service which facilitates interfacing and communicating with a notification engine 406 and other components of the system backend 307, for example.

The website interface 418 can be interactive and accessible to a customer using web browser software at an electronic device 306. The website interface 418 may also include a mobile application or consumer electronics device application. Rentable media articles may be searched, browsed, and reserved on the website interface 418 for receipt at the article dispensing machines 230. The location of and the inventory at article dispensing machines 230 can be viewed at the website interface 418. Digital media selections from content providers, such as streaming, downloadable, and on-demand media, may also be searched, browsed, and accessed on the website interface 418. A customer can access their customer profile on the website interface 418 for purposes of verifying and updating their personal information in the customer profile database 404. For example, a customer can link an account they have with a content provider on the website interface 418 by specifying their username, password, account number, and/or other identifying information for the content provider account. The system backend 307 can utilize SAML (Security Assertion Markup Language), OAuth (Open Authentication), or other protocols to authenticate the identity of the customer at the content provider via a connection from the website interface 418 to the content provider identification and authentication controller 506 in the content provider backend 308, as shown in FIG. 5. If the identifying information matches the content provider account, the linkage to the content provider account can be stored in the customer profile database 404.

An inventory database 412 may contain a catalog of physical media articles that may be rented at the article dispensing machines 230 and reserved at the website interface 418 for later receipt at the article dispensing machines 230. A catalog of digital media selections available at the content provider can be contained in the metadata database 410. Metadata for the media articles, media selections, theatrical movie releases, and miscellaneous media sources are stored in the metadata database 410, including title, release date, running time, chapter information, technical details (resolution, audio options, languages, etc.), format, peripheral device requirements, number of players, online capability, actors, voice actors, director, studio, publisher, developer, platform, availability of downloadable content, episode information, genre, critic ratings, individualized ratings (reviews, recommendations, likes, etc.), parental ratings (MPAA, ESRB, TV Parental Guidelines, etc.), description, related content, media artwork, media stills, and other information.

Physical media articles that may be rented at the article dispensing machines 230 and digital media selections available at the content provider may be synchronized and mapped to one another by matching their respective metadata. As seen in FIG. 5, a synchronization and mapping engine 414 connected to the customer profile database 404, the metadata database 410, and the content provider asset management system 504 in the content provider backend 308 may compare the metadata for the media articles and media selections to determine matches. Metadata in the content provider asset management system 504 for media selections can be compared to metadata in the metadata database 410 to perform the matching. For example, a combination of a title, release date, running time, and/or actor information can be used to map a media article to a corresponding media selection. In one embodiment, proprietary identification codes unique to a media article and a media selection can be used to map the media article to the corresponding media selection. The proprietary identification codes for the media article and the media selection can be stored in the metadata database 410 and the content provider asset management system 504, respectively. Such proprietary identification codes can be assigned to media articles and media selections by third party providers such as Rovi, Baseline, and AMG.

Availability information for theatrical media releases, including theatrical films and theatrical film preview trailers, may also be stored in the metadata database 410. The availability information may include the release date of the theatrical media releases, including multiple release dates for different geographical locations. The theatrical media releases may also be synchronized and mapped to physical media articles and digital media selections using the synchronization and mapping engine 414. Metadata for each of the media articles, media selections, and theatrical media releases may be compared to perform the matching, as described above.

Figure 6:
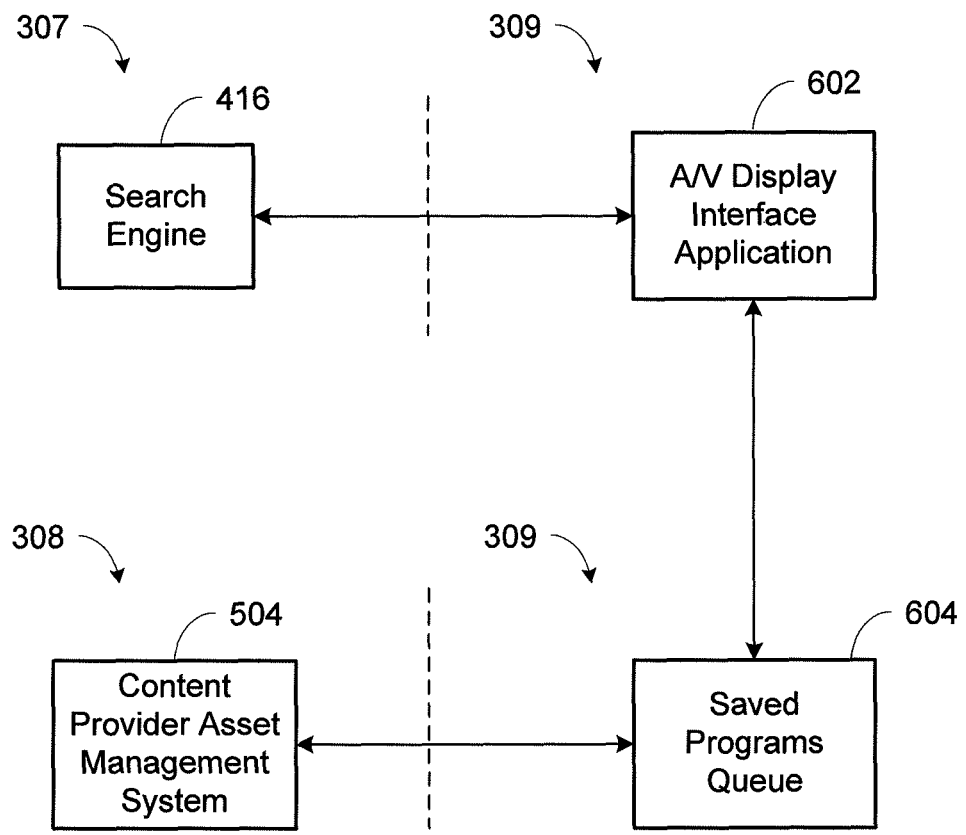
FIG. 6 is a block diagram illustrating connections between the system backend, the content provider backend, and the A/V display interface.

A media selection at a content provider can be placed in the saved programs queue 604 on the A/V display interface 309, as shown in FIG. 6, by providing the appropriate instructions to the content provider asset management system 504 in the content provider backend 308. Queuing a media selection may occur, for example, when a customer decides to purchase the digital media selection from the content provider in place of a physical media article at an article dispensing machine 230.

An inventory database 412 can be connected to the article dispensing machine 230 and the metadata database 410 to provide information regarding the availability of media articles in the article dispensing machines 230. In conjunction with a search engine 416, the inventory database 412 and the metadata database 410 can provide inventory results for media articles and media selections to an A/V display interface application 602 on an A/V display interface 309, as shown in FIG. 6. Such results may include the availability of physical media articles at the article dispensing machines 230 as well as digital media selections available at a content provider. The results may also be provided to the website interface 418 or other websites operated by a content provider, for example. The synchronization and mapping engine 414 can store the information from the content provider asset management system 504 regarding media selections at the content provider in the metadata database 410. The inventory database 412 can also supply the availability of media articles in the article dispensing machines 230 to the website interface 418 or to other portals, such as an application on a mobile device, when queried.

A metadata database watcher 408 can monitor the metadata database 410 for changes in metadata related to media articles, media selections, theatrical media releases, live content, and/or miscellaneous media sources. The metadata database watcher 408 can use customer watchlist subscriptions from a customer profile in the customer profile database 404 to determine what changes to monitor. Customer watchlist subscriptions may include subscriptions where a customer opts into a particular subscription. The changes to the metadata can include inventory availability, content provider availability, release schedules, and other information related to a particular title. The customer watchlist subscriptions can be used by the metadata database watcher 408 to monitor these changes in combination with information regarding particular actors, directors, and/or other metadata. When a change corresponding to a customer watchlist subscription is found by the metadata database watcher 408, a notification engine 406 can transmit notifications and details of the change to the customer. The notifications may be sent via email, SMS, mobile application alerts, A/V display interface alerts, instant messaging alerts, or other electronic channels.

A customer may also subscribe to be notified about new information and new media content related to their favorite actors, directors, titles, studios, and/or other parameters using customer notification subscriptions. Such information may include information related to live content, live performances, television appearances, newspaper and magazine articles, blogs, and other content. A web crawler and data feed 420 can obtain this information by searching pertinent websites and through use of a public API connection to update the metadata database 410. The data feed in the web crawler and data feed 420 may include, for example, information that is pushed from an information source or pulled from an information source. The customer can subscribe to this information about their favorites at the website interface 418, for example. The metadata database watcher 408 monitoring the metadata database 410 can detect when there is a new piece of information about a favorite and transmit the desired notifications using the notification engine 406.

Figure 7:
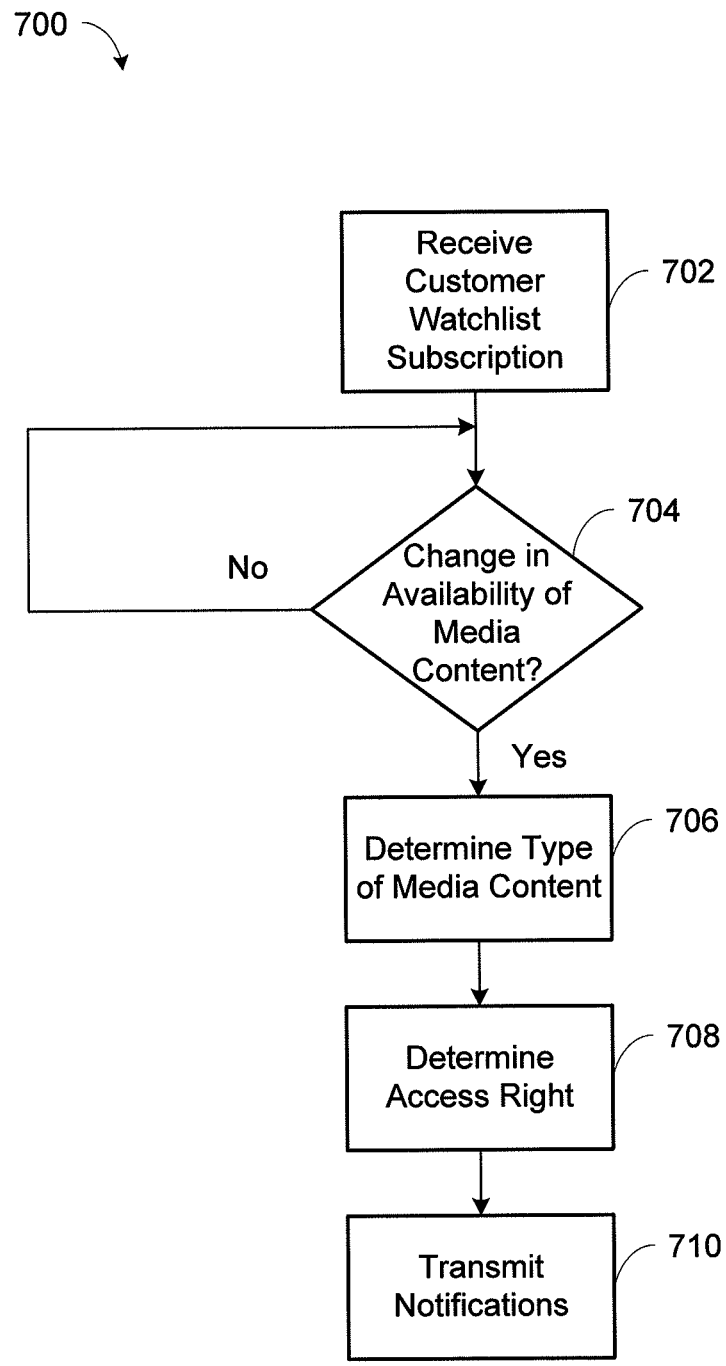
FIG. 7 is a flowchart illustrating operations for generating a notification of availability of media content.

An embodiment of a process 700 for generating notifications related to the availability of media content using the metadata database 410 and the notification engine 406 is shown in FIG. 7. The process 700 can result in the transmission of notifications describing the availability of physical media articles, digital media selections, live content, and theatrical media releases. A user may subscribe to receive notifications of the availability of different types of media content. The user can specify in the customer watchlist subscription one or more types of metadata corresponding to media content that they wish to be notified about. Availability notifications may include a specific date that the piece of media content will be released, such as the date a media article or media selection corresponding to the media content is available for rent or purchase, or the date when the theatrical media release will be available to view in theaters, on television, etc. The notifications may be filtered based on a customer's subscription package with an associated content provider for a digital media selection. A user may also indicate the desired frequency of notifications. The customer watchlist subscription can be stored in the customer profile database 404.

Media content that is included in a notification can include media articles, media selections, live content, and/or theatrical media releases that directly match the specified metadata in the customer watchlist subscription. The notification may also include media content that is indirectly associated with the specified metadata in the customer watchlist subscription, such as media content from the same series, with the same actor(s), with the same director, etc. For example, if the customer watchlist subscription includes the title metadata "Camelot", the notification provided by the process 700 may include direct matches, such as a media selection listing for the television series Camelot on the premium cable channel Starz, available as a video-on-demand, and a media article listing for the 1967 movie Camelot, available for rental from an article dispensing machine 230. The notification may also include indirect matches for associated media articles and associated media selections, such as the King Arthur video game or the Merlin television miniseries on DVD, that are available at an article dispensing machine 230 and/or from a content provider. Metadata for the associated media articles and media selections may match the customer watchlist subscription, which can cause the associated media articles and media selections to be included in the notification. In the example above, the Merlin television miniseries may appear in the notification because the metadata "Camelot" may match a plot keyword in the metadata of that particular media article. In an alternative embodiment, the indirect matches may appear in the notification due to metadata from the direct matches. The metadata from the direct matches may not directly match the customer watchlist subscription, but instead lead to the indirect matches. In the example above, the King Arthur video game may appear in the notification not because "Camelot" is in the metadata for the video game, but because the direct matched television series Camelot has metadata including "King Arthur".

As another example, if a customer watchlist subscription includes the actor metadata "Clint Eastwood", the notification provided by the process 700 may include direct matches, such as a media article listing for the movie Unforgiven available for rental from an article dispensing machine 230. Indirect matches based on this metadata may include other media content in which Clint Eastwood appears as an actor (e.g., Dirty Harry, In the Line of Fire, etc.) and/or where Clint Eastwood is a director (e.g., Invictus, Flags of Our Fathers, etc.).

In some embodiments, the rental or purchase history of the customer from the customer database 404 may also be utilized in conjunction with the other metadata, as described above, to determine the media content in a notification. For example, if a customer watchlist subscription includes the title metadata for the movie Return of the Jedi, indirect media selections may be determined, such as the movies The Empire Strikes Back and Star Wars Episode I: The Phantom Menace. The indirect media selections may be determined based on metadata for the movie Return of the Jedi and/or the prior rental history of the customer that may include, for example, rentals of the movie Star Wars and the video game Star Wars: Battlefront.

As a further example, the customer watchlist subscription can specify metadata related to a specific title, e.g., the movie Harry Potter and the Sorcerer's Stone, for which the user wants notifications of availability. In this example, the notification can include the date that the movie Harry Potter and the Sorcerer's Stone will be available as a digital media selection. In addition, the notification may include the date when a related piece of media content will be available, such as when the movie Harry Potter and the Deathly Hallows—Part 1 will be available as a media article at the article dispensing machines 230, or when the movie Harry Potter and the Deathly Hallows—Part 2 will be released as a theatrical media release at a theater. As another example, the customer watchlist subscription may specify metadata related to an actor and/or a director so that the user is notified when a piece of media content is available with the actor and/or the director.

The availability and release dates of media content may include whether a certain title is "coming soon" to or "leaving soon" from an article dispensing machine 230, a content provider, or a theater. Availability and release dates may be designated by studios that produced and created the media. The metadata database 410 can contain metadata information for one or more physical media articles, such as DVDs, Blu-Ray discs, and/or video games; one or more digital media selections, such as streaming videos, videos-on-demand, streaming video games, and/or downloadable video games; and one or more theatrical media releases, such as theatrical films and theatrical film preview trailers. An inventory database 412 can be in communication with the metadata database 410, and contain information regarding the availability of media articles at the article dispensing machines 230. The metadata database 410, the inventory database 412, and/or other databases may include availability window information that keeps track of when a piece of media content is available from or at a particular source. For example, a movie may be available initially as a theatrical film release, then may be available on a premium cable channel, as a digital media selection, for rental or purchase as a media article from an article dispensing machine 230, etc. When the movie is available from or at each of the particular sources, the user may be notified.

At step 702, a customer watchlist subscription can be received and stored in the customer profile database 404. The customer watchlist subscription may be created and/or updated by a user through the website interface 418 that is accessible on electronic device 306, for example, and may include keywords and phrases that match metadata of media content in the metadata database 410. An application 602 executing on an A/V display interface 309 or the electronic device 306 may also transmit the customer watchlist subscription to be received and stored in the customer profile database 404. In another embodiment, a QR code may be scanned by a customer to register piece(s) of media content in their customer watchlist subscription. For example, the QR code may be displayed on a movie poster or during a theatrical film preview trailer and scanned by the customer.

At step 704; the metadata database watcher 408 determines whether a change in the availability of media content has occurred in the metadata database 410, based on the specified metadata in the customer watchlist subscription received at step 702. The availability of media content can include a stock status, a viewing availability status, or a price status. The stock status may apply to physical media articles that are distributed from article dispensing machines 230, and may include whether the media article is in-stock, out-of-stock, coming soon into stock, or leaving soon from stock. An example of when a media article is coming soon into stock is prior to the release date of the media article, and an example of when a media article is leaving soon from stock is prior to when the media article can no longer be contractually offered in the article dispensing machine 230. The viewing availability status may apply to a digital media selection, live content, or a theatrical media release, and may include whether the media selection, live content, or theatrical media release is available to view, unavailable to view, coming soon to view, or leaving soon to view. For example, availability to view may include whether a media selection is available for downloading. As another example, a theatrical media release is available to view if it is currently being shown in a theater, but is coming soon to view prior to the release date of the theatrical media release. The price status may apply to any type of media content and may include whether a price increase or a price decrease corresponding to the media content has or will have occurred.

If no changes in the availability of media content have occurred at step 704, then the metadata database watcher 408 continues to monitor the metadata database 410 for changes. However, if changes to the availability of media content are detected in the metadata database 410 at step 704, then the type of media content for which the changes occurred can be determined at step 706. The type of media content, as described above, can include a physical media article, a digital media selection, live content, or a theatrical media release. The access rights to the media content may be determined at step 708, depending on the type of media content determined at step 706. Access rights for media articles may include whether the media article is available at an article dispensing machine 230, as detailed below in the process 900 shown in FIG. 9. For media selections, access rights may include whether the media selection is accessible to the customer based on their subscription, as discussed below in the process 1000 shown in FIG. 10.

At step 710, after the access rights to the media content have been determined, notifications are transmitted by the notification engine 406 with the availability of the media content, according to the customer watchlist subscription. The customer watchlist subscription can include preferences related to the different electronic channels for receipt of the notifications, such as email, SMS, mobile application alerts, and/or A/V display interface alerts. One or more notifications can be transmitted by the notification engine 406 at step 710, depending on the preferences set in the customer watchlist subscription. The notifications may include the media content, i.e., the name of the media article, media selection, live content, or theatrical media release, and the stock status, viewing availability status, or price status, as applicable, depending on the type of change determined at step 704. Specific dates may also be included in the notifications. In one embodiment, the notification may include a uniform resource locator (URL) link to view further details regarding the availability of the media content. In another embodiment, a QR code representing a URL link to view further availability details may be displayed.

Figure 8:
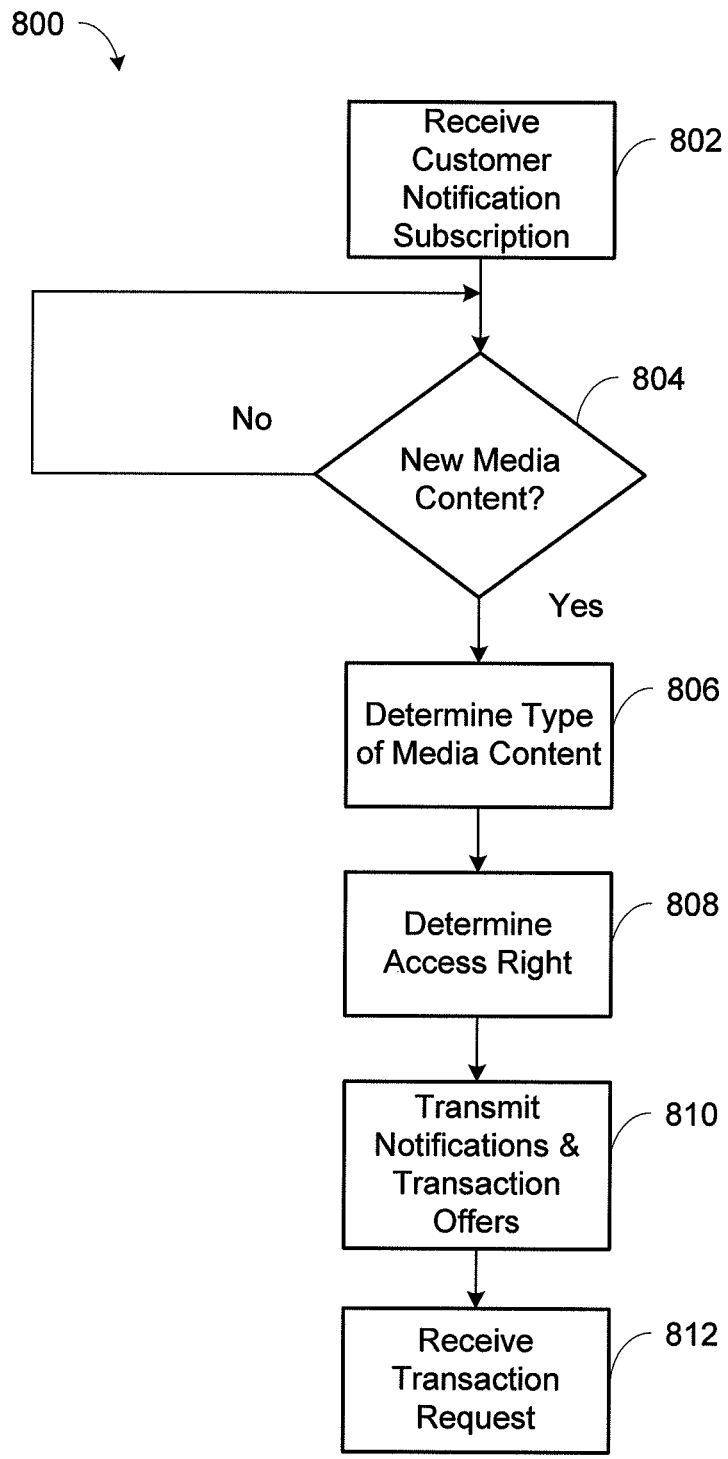
FIG. 8 is a flowchart illustrating operations for generating a notification related to new media content.

An embodiment of a process 800 for generating notifications related to new media content using the metadata database 410 and the notification engine 406 is shown in FIG. 8. The process 800 can result in the transmission of notifications regarding new physical media articles, digital media selections, live content, theatrical media releases, and/or miscellaneous media sources that match metadata preferences in a customer notification subscription. A user may subscribe to receive notification information related to the different types of new media content by specifying one or more types of metadata corresponding to the new media content that they wish to be notified about. Notifications transmitted by the process 800 may include the new media content and a transaction offer related to the new media content. The notifications may be filtered based on a customer's subscription package with an associated content provider for a digital media selection. A user may also indicate the desired frequency of notifications. The customer notification subscription can be stored in the customer profile database 404.

New media content that is included in a notification can include media articles, media selections, live content, theatrical media releases, and/or miscellaneous media sources that directly match the specified metadata in the customer notification subscription. The notification may also include new media content that is indirectly associated with the specified metadata in the customer notification subscription, as detailed above.

The metadata database 410 can contain metadata information for one or more physical media articles, such as DVDs, Blu-Ray discs, and/or video games; one or more digital media selections, such as streaming videos, videos-on-demand, streaming video games, and/or downloadable video games; one or more theatrical media releases, such as theatrical films and theatrical film preview trailers; live content, such as television broadcasts and internet broadcasts; and one or more miscellaneous media sources, such as live performances, television appearances, print media articles (available digitally or physically, e.g., news, editorials, etc.), or internet postings (including blog posts, Twitter posts, discussion board postings, etc.). An inventory database 412 can be in communication with the metadata database, and contain information regarding the availability of media articles at the article dispensing machines 230.

At step 802, a customer notification subscription can be received and stored at the customer profile database 404. The customer notification subscription may be created and/or updated by a user through the website interface 418 that is accessible on electronic device 306, for example, and may include keywords and phrases that match metadata of new media content in the metadata database 410. An application 602 executing on an A/V display interface 309 or the electronic device 306 may also transmit the customer notification subscription to be received and stored in the customer profile database 404.

At step 804, the metadata database watcher 408 monitors the metadata database 410 to determine whether new media content exists, based on the specified metadata in the customer notification subscription received at step 802. The new media content may include the availability of the new media content, such as a stock status, a viewing availability status, or a price status. The stock status may apply to physical media articles that are distributed from article dispensing machines 230, and may include whether the media article is in-stock, out-of-stock, coming soon into stock, or leaving soon from stock. The viewing availability status may apply to a digital media selection, live content, a theatrical media release, or a miscellaneous media source, and may include whether the media selection, live content, theatrical media release, or miscellaneous media source is available to view, unavailable to view, coming soon to view, or leaving soon to view. The price status may apply to any type of new media content and may include whether a price increase or a price decrease of the new media content has or will have occurred.

If no new media content has been detected at step 804, then the metadata database watcher 408 continues to monitor the metadata database 410. However, if new media content is detected in the metadata database 410 at step 804, then the type of the new media content is determined at step 806. The type of the new media content, as described above, can include a physical media article, a digital media selection, live content, a theatrical media release, or a miscellaneous media source. The access rights to the new media content may be determined at step 808, depending on the type of new media content determined at step 806. Access rights for a new media article may include whether the new media article is available at an article dispensing machine 230, as detailed below in the process 900 shown in FIG. 9. For new media selections, access rights may include whether the new media selection is accessible to the customer based on their subscription, as discussed below in the process 1000 shown in FIG. 10. Access rights related to new miscellaneous media source is discussed below in the process 1100 shown in FIG. 11.

At step 810, after the access rights to the new media content have been determined, notifications are transmitted by the notification engine 406 describing the new media content, according to the customer notification subscription. The customer notification subscription can include preferences on how to receive the notifications, such as email, SMS, mobile application alerts, and/or A/V display interface alerts. In one embodiment, the notification may include a uniform resource locator (URL) link to view further details regarding the new media content or to view the new media content itself. In another embodiment, a QR code representing a URL link may be displayed. One or more notifications can be transmitted by the notification engine 406 at step 810, depending on the preferences set in the customer notification subscription. The notifications may include the new media content, i.e., the name of the media article, media selection, live content, theatrical media release, or miscellaneous media source, and the stock status, viewing availability status, or price status, as applicable. The notifications transmitted at step 810 may further include a transaction offer related to the new media content. The transaction offer may be a reservation offer, a pre-reservation offer, a viewing offer, or a purchase offer that applies to the new media content. Transaction offers may or may not involve payment for access to the new media content, depending on the type of the new media content. For example, purchase of a ticket for a live performance of an actor involves payment, but viewing a blog posting regarding an actor generally does not require payment.

A reservation offer may be applicable to new media content that can be reserved for rental and/or pickup. A pre-reservation offer may be applicable to new media content that is not yet available but can be reserved in advance for future rental or pickup. The new media content related to reservation and pre-reservation offers may include a media article distributed at an article dispensing machine 230, for example. Viewing offers may be applicable to new media content, such as digital media selections, that can be streamed or downloaded at an A/V display interface 309. A viewing offer may also apply to miscellaneous media sources that can be viewed on the A/V display interface 309, such as an internet posting. A purchase offer may be applicable to new media content that can be bought, including media articles, tickets for theatrical media releases, and tickets for miscellaneous media sources, such as live performances.

A transaction request may be received at step 812 in response to the transaction offer in the notification transmitted at step 810. The transaction request may be related to a media article, a media selection, live content, a theatrical media release, and/or a miscellaneous media source. For example, a media article could be reserved, pre-reserved, or purchased from an article dispensing machine 230 in response to a reservation offer, pre-reservation offer, or purchase offer, respectively. In another example, a ticket may be purchased in response to a purchase offer related to a theatrical media release that is available to view in the theater. In a further example, a video-on-demand could be streamed in response to a viewing offer related to a digital media selection. In another example, a digital video recording may be requested by a user in response to a viewing offer related to an upcoming television appearance by an actor. In a further example, a ticket may be purchased in response to a purchase offer related to a live performance by an actor.

Any payment related to the transaction request may be received along with the transaction request at step 812. Payment may be needed, for example, when a user's particular subscription package does not currently include access to a media selection but where the user could access the media selection by upgrading to a premium subscription package. As another example, payment may be needed if the media selection is available from an a la carte content provider that requires payment for individual purchases. The payment received may include, for example, a credit or debit card charge, charging the payment to a customer account at the content provider or at a mobile provider, redeeming credits or promotion codes, or other payment methods.

Figure 9:
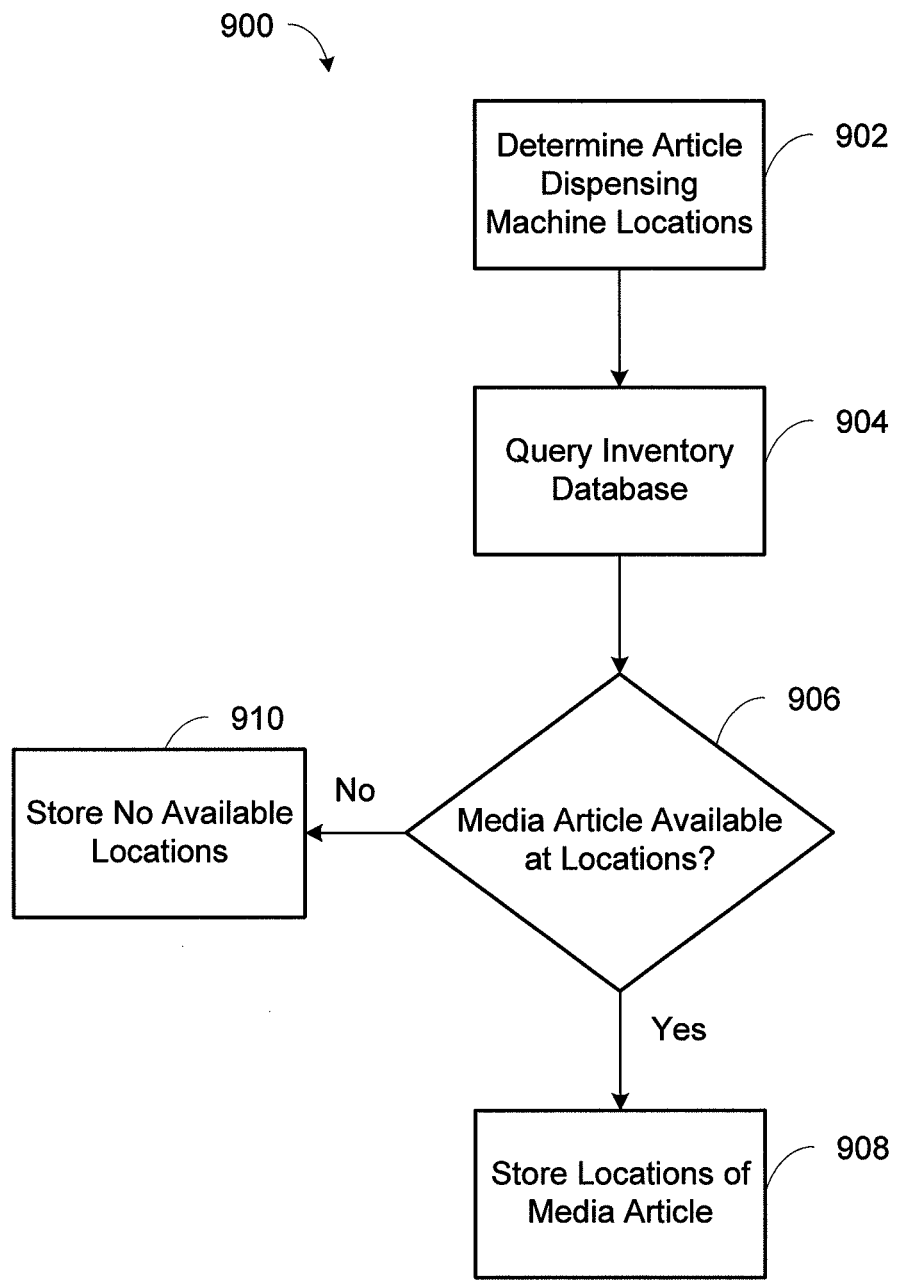
FIG. 9 is a flowchart illustrating operations for determining access rights to a media article.

An embodiment of determining access rights to media articles is shown in the process 900 of FIG. 9. The process 900 may be implemented as step 708 of FIG. 7 or step 808 of FIG. 8 if the media content or new media content, respectively, is a media article that may be available at an article dispensing machine 230. At step 902, the location of one or more article dispensing machines 230 can be determined. The location(s) of the article dispensing machines 230 can be determined based on geographic proximity to the location where the customer or user is located, such as based on the address of the customer in the customer profile database 404. The article dispensing machine 230 locations could also be determined based on a location that is manually entered by a user. The locations of the article dispensing machines 230 that are closest to the originating location may then be determined. The locations may be limited by a radius, city, town, zip code, or other limitation. The location of one or more specific article dispensing machines 230 may also be input by a user at step 902.

At step 904, the inventory database 412 can be queried to determine whether the media article is available at the locations of the article dispensing machines 230 determined at step 902. If the media article is available at one or more article dispensing machines 230 at step 906, then at step 908, the locations of those article dispensing machines 230 can be stored for use in the notifications transmitted by the processes 700 or 800. However, if the media articles are not available at any article dispensing machine 230 at step 906, then no available locations can be stored at step 910.

Figure 10:
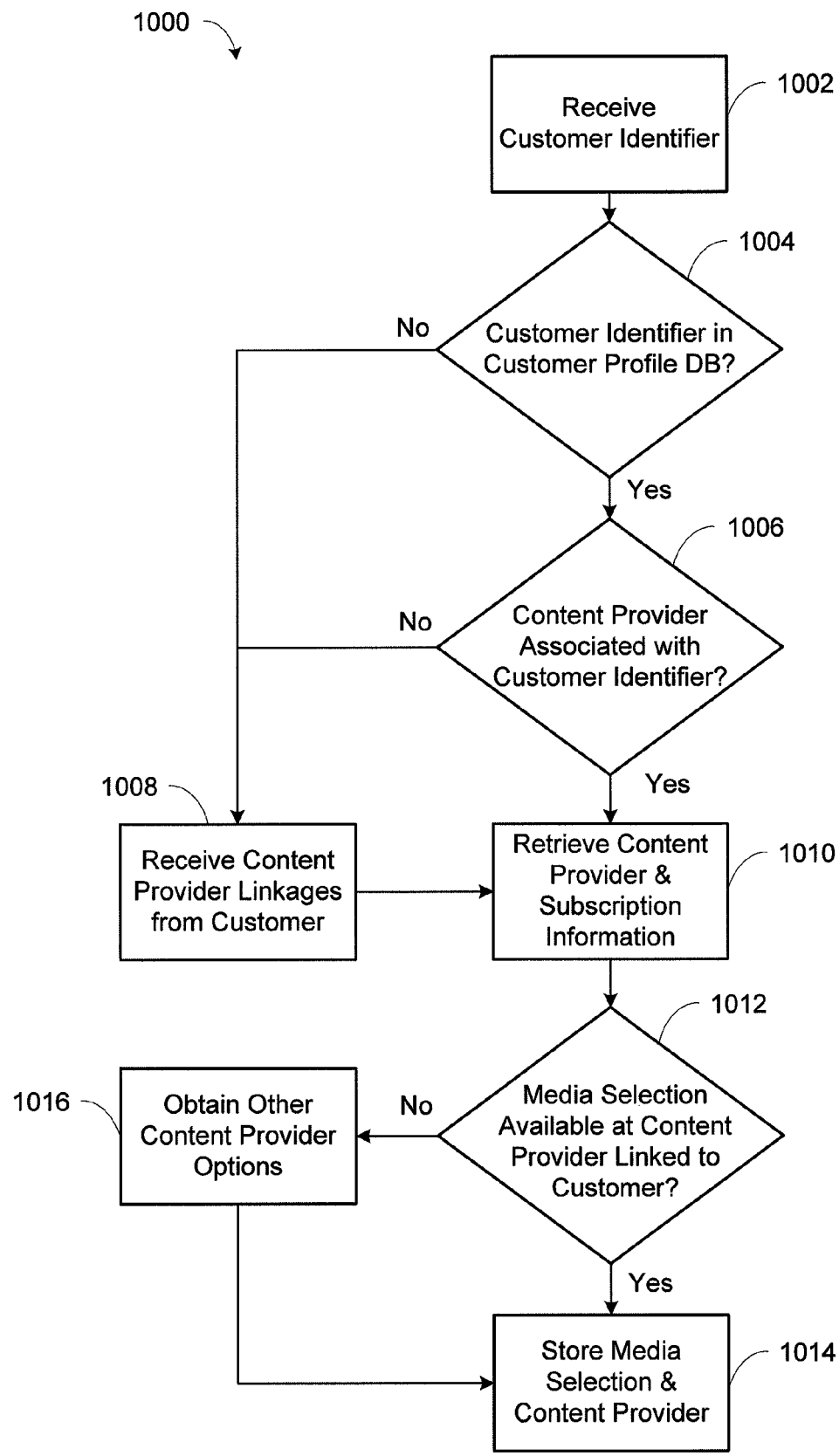
FIG. 10 is a flowchart illustrating operations for determining access rights to a media selection.

An embodiment of determining access rights to media selections is shown in the process 1000 of FIG. 10, including determination of an associated content provider and the availability of the media selections at the associated content provider. The process 1000 may be implemented as step 708 of FIG. 7 or step 808 of FIG. 8 if the media content or new media content, respectively, is a digital media selection that may be available at a content provider. At step 1002, a unique customer identifier may be received by the central controller 302. The central controller 302 can match the unique customer identifier to a particular customer profile in the customer profile database 404. The unique customer identifier could be a credit or debit card number processed through a hash function. The hashed credit or debit card number can be used to look up a customer profile in the customer profile database 404. The unique customer identifier may also include a customer-provided identification of the associated content provider. The customer could also provide what content providers they are associated with, and optionally provide the specific subscription package they subscribe to, instead of providing a credit card number or account number.

If the unique customer identifier is present in the customer profile database 404 at step 1004, then the process continues to step 1006. At step 1006, the central controller 302 can determine whether there is an associated content provider linked to the customer profile found at step 1004. The customer profile in the customer profile database 404 may contain a linkage to an associated content provider. If there is not a content provider associated with the customer profile at step 1006 or if no unique customer identifier is found in the customer profile database 404 at step 1004, the customer may provide the linkages of content providers at step 1008. The customer profile in the customer profile database 404 can include information obtained from the content provider customer profile database 502 in the content provider backend 308, such as an account number, email address, subscription information, and other information related to the customer's content provider customer profile.

If there is a content provider associated with the customer identifier at step 1006, the process continues to step 1010 where subscription information at the content provider for the customer is retrieved from the customer profile database 404. The customer profile database 404 may contain subscription and entitlement information that was previously received from the content provider customer profile database 502 in the content provider backend 308. Subscription information at the content provider can include the customer's subscribed service package, premium channel content the customer entitled to access, zip code and address for possible geographical content restrictions, parental authorization and controls for age authentication, and other subscriber information. The subscription information may be used by the central controller 302 at step 1012 when determining the availability of media selections for the customer at particular content providers. Step 1010 is also performed following step 1008 when a customer has entered a linkage to a content provider.

At step 1012, the central controller 302 determines whether the media selections are available at a content provider that is linked to the customer. In addition to determining whether the media selections are available at a linked content provider, the central controller 302 can determine at step 1012 whether the customer has permission to access the media selection based on the subscription information in the customer profile database 404 that was previously obtained at step 1010.

A customer may be entitled to access a digital media selection for free, such as when the media selection is already available within the customer's subscription package, or when the media selection is publicly available. In other cases, a customer may only have access to a media selection by providing additional payment, such as when the customer's subscription package does not allow access to the media selection or when the media selection is only available at an a la carte content provider. For example, if the customer's subscription package allows access to Home Box Office (HBO) content and the media selection is available through HBO, then the customer will have access to the media selection without additional payment. As another example, if the customer's subscription package only allows access to Showtime content and the media selection is only available through HBO, then the customer will not have access to the media selection. In this case, the customer may have the option to upgrade their subscription package to include HBO or utilize an a la carte content provider for an additional payment. As a further example, if the customer is a Comcast subscriber and the media selection is available as a free video-on-demand selection on Comcast, then the customer will have access to the media selection without additional payment. However, if the media selection is only available through Hulu Plus, then the customer will not have access to the media selection unless the customer provides additional payment.

Therefore, if the media selection is available at a linked content provider at step 1012, then at step 1014, the media selections and associated content providers can be stored for later use in the notifications transmitted by the processes 700 and 800. If the media selection is not available at a linked content provider at step 1012, then the central controller 302 can obtain other content provider options, if any, at step 1016. Other content provider options may include a la carte content providers such as Amazon Instant Video, iTunes Store, YouTube, VUDU, and other services that allow a user to individually purchase media without requiring a subscription. Further content provider options that may be obtained at step 1016 include retailers that grant rights to a digital media selection in conjunction with the purchase of a physical item (e.g., Best Buy, Walmart, etc.), movie studios, television networks, video game developers, and online gaming delivery services (Xbox Live, PlayStation Network, OnLive, etc.). For example, a video game may be available from an online gaming delivery service for download, such as from Xbox Live or the PlayStation Network, or for streaming, such as from OnLive. If other content providers are available for the media selection, the media selection and the associated a la carte content provider(s) may be stored at step 1014.

Figure 11:
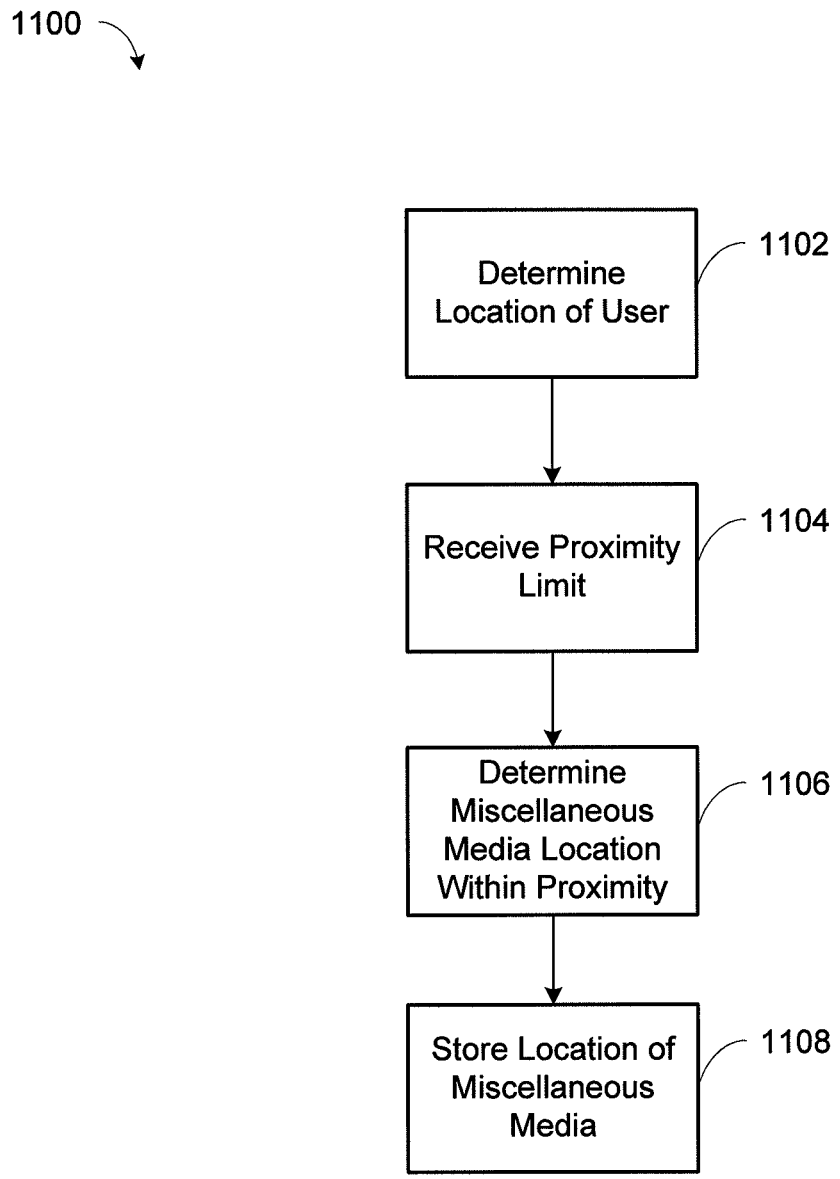
FIG. 11 is a flowchart illustrating operations for determining access rights to a miscellaneous media source.

An embodiment of determining access rights to a miscellaneous media source is shown in the process 1100 of FIG. 11. The process 1100 may be implemented as step 808 of FIG. 8 if the new media content involved in the process 800 is a new miscellaneous media source. As described above, a miscellaneous media source may include live performances, television appearances, print media articles, or internet postings. At step 1102, the geographic location of the customer or user is determined, such as based on the address of the customer in the customer profile database 404. The geographic location determined at step 1102 could also be manually entered by the user, determined based on the IP or MAC address of an electronic device 306 or A/V display interface 309, or determined based on Global Positioning System (GPS) coordinates. At step 1104, a proximity limit or radius may be received that can limit the search for locations related to the miscellaneous media source in the process 1100. The proximity limit may be received from a user or may be a predetermined default limit. The proximity limit may include a mile radius, a kilometer radius, or other limit. Based on the geographic location of the user determined at step 1102 and the proximity limit received at step 1104, the miscellaneous media sources that are located within the proximity limit may be determined at step 1106. At step 1108, the miscellaneous media source located with the proximity limit may be stored for use in the notifications transmitted by the process 800. It is understood by those in the art that an IP address is a numerical label assigned to any device participating in a computer network that uses the Internet Protocol for communication. It is also understood by those in the art that a MAC address is a unique hexadecimal identifier assigned to a network interface of a device. The MAC address of the A/V display interface 309, for example, may be associated with a customer profile that contains an address.

The process 1100 may be implemented for miscellaneous media sources that occur in a specific geographic location, such as a live performance, or that are related to a geographic location, such as a local newspaper. By determining the location of the user related to the location of the miscellaneous media source, only relevant miscellaneous media sources may be included in the notifications transmitted by the process 800. For example, if a customer wants to be notified of live performances by a certain actor or comedian, the notifications can include only live performances that are local to the customer, rather than all of the performances nationwide. However, the customer could specify a larger proximity limit if the customer wishes to be notified about live performances in nearby cities. As another example, if a customer desires to be notified of news reports, the notifications can include only reports that are only in a local newspaper or magazine.

Figure 12:
FIG. 12 is an exemplary screenshot of an interface related to generating notifications of availability of media content.
Figure 13:
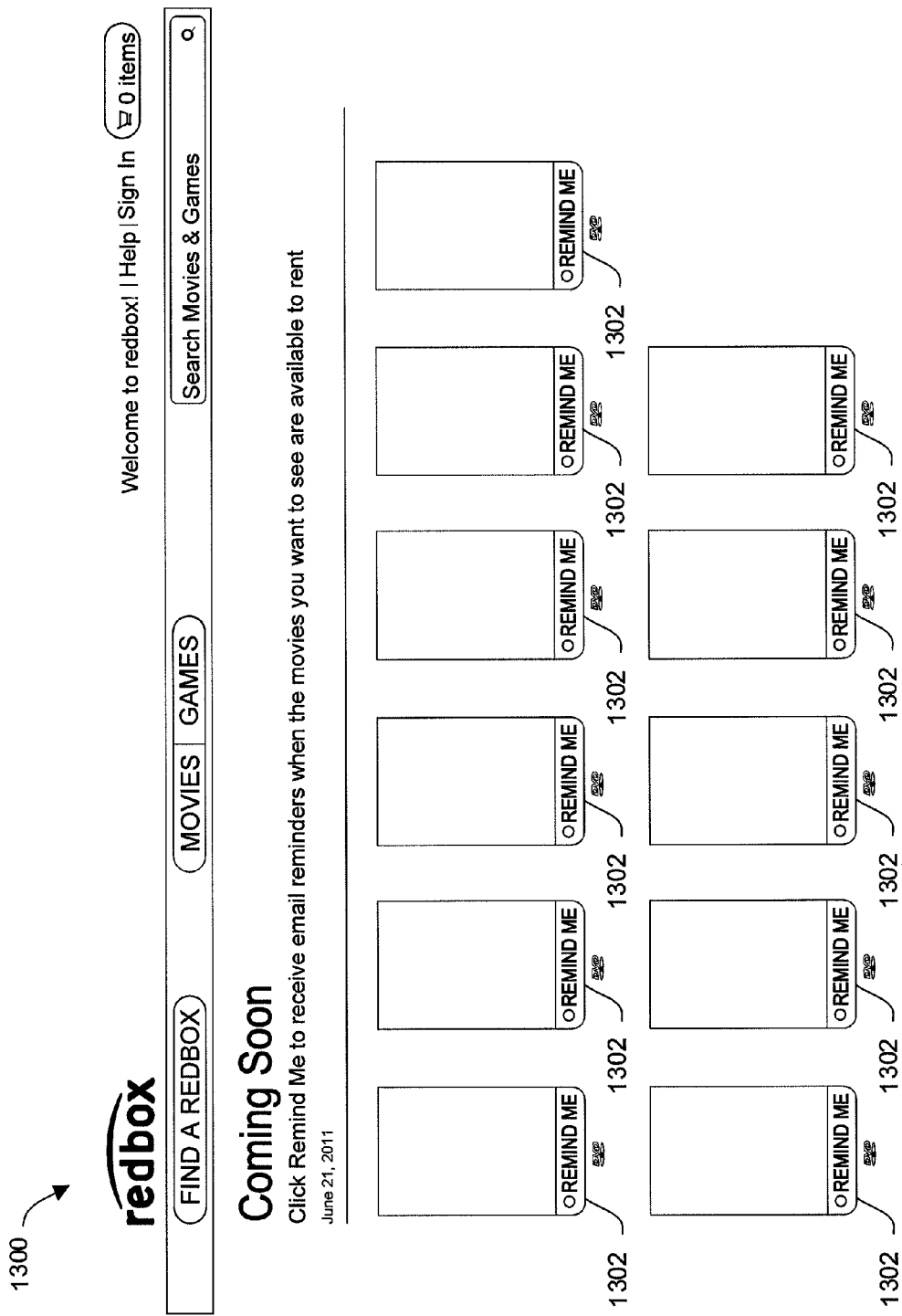
FIG. 13 is an exemplary screenshot of an interface related for generating notifications of availability of media content.

FIG. 12 is an exemplary screenshot of an interface 1200 related to generating notifications of availability of media content. FIG. 13 is an exemplary screenshot of an interface 1300 for generating notifications of availability of media content. The interfaces 1200 and 1300 may be displayed on the website interface 418, for example. A user may interact with the interface 1200 when the user wishes to view the releases of media content that is coming soon, such as media articles that are coming soon for rental from an article dispensing machine 230. Upon interaction with the interface 1200, the interface 1300 may be displayed which can allow the user to select zero, one, or more pieces of media content that the user wishes to receive availability notifications for. For example, the user may click on any of the "Remind Me" buttons 1302 on the interface 1300 to generate a notification for inventory availability, which may be included in their customer watchlist subscription or customer notification subscription, as described above.

Any process descriptions or blocks in figures should be understood as representing modules, segments, or portions of code which include one or more executable instructions for implementing specific logical functions or steps in the process, and alternate implementations are included within the scope of the embodiments of the present invention in which functions may be executed out of order from that shown or discussed, including substantially concurrently or in reverse order, depending on the functionality involved, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. All such modifications are intended to be included herein within the scope of this disclosure and the present invention and protected by the following claims.

The invention claimed is:

1. A method of generating a notification related to new media content, a type of the new media content comprising one or more of a media article for being available at an article dispensing machine, a media selection, a theatrical media release, live content, or a miscellaneous media source, the method comprising:
 receiving a customer notification subscription comprising a notification request to monitor for the new media content based on metadata of the new media content, wherein the metadata of the new media content are stored in a metadata database connected to a processor;
 detecting the new media content based on the customer notification subscription by accessing a third-party content provider asset management system;
 when the new media content is detected:
 determining an access right to the new media content based on:
 determining whether a subscription package corresponding to a customer includes the new media content,
 determining the type of the new media content, and
 querying an inventory database connected to the processor to determine a stock status of the new media content at the article dispensing machine; and
 transmitting the notification of the new media content based on the determined access right, the notification comprising a transaction offer related to the new media content and the stock status of the new media content at the article dispensing machine.

2. The method of claim 1, wherein the metadata database comprises the metadata of the new media content, and the metadata of the new media content comprises at least one of a release date, a a running time, chapter information, technical details, a format, a peripheral device requirement, number of players, online capability, an actor, a voice actor, a director, a studio, a publisher, a developer, a platform, availability of downloadable content, episode information, a genre, a critic rating, an individualized rating, a parental rating, a description, related content, media artwork, a media still, or a proprietary identification code.

3. The method of claim 1, wherein the new media content comprises a change in a stock status, the stock status comprising one or more of in-stock, out-of-stock, coming soon into stock, or leaving soon from stock.

4. The method of claim 1, wherein determining the access right to the new media content further comprises:
   determining a first location based on a location stored in a customer profile database connected to the processor; and
   determining a second location of the article dispensing machine closest to the first location;
   querying the inventory database comprises querying the inventory database to determine the stock status of the media article at the second location of the article dispensing machine; and
   the notification further comprises the second location of the article dispensing machine.

5. The method of claim 1, wherein the new media content comprises a change in a viewing availability status, the viewing availability status comprising one or more of available to view, unavailable to view, coming soon to view, or leaving soon from view.

6. The method of claim 5, wherein determining the access right to the new media content comprises:
   associating a unique customer identifier with a customer subscription at an associated content provider, wherein the customer subscription is stored in a customer profile database connected to the processor; and
   determining the viewing availability status of the media selection based on an access permission for the media selection in the customer subscription; and
   the notification further comprises the media selection and the viewing availability status of the media selection.

7. The method of claim 5, wherein determining the access right to the new media content comprises determining the viewing availability status of the theatrical media release based on a release date of the theatrical media release; and the notification further comprises the theatrical media release and the viewing availability status of the theatrical media release.

8. The method of claim 5, wherein determining the access right to the new media content comprises determining the viewing availability status of the miscellaneous media source; and the
   notification further comprises the miscellaneous media source and the viewing availability status of the miscellaneous media source.

9. The method of claim 8, wherein determining the access right to the new media content further comprises:
   determining a third location based on a location stored in a customer profile database connected to the processor; and
   determining a fourth location of the miscellaneous media source within a proximity limit around the third location; and
   the notification further comprises the fourth location.

10. The method of claim 1, wherein the new media content comprises a change in a price status, the price status comprising one or more of a price increase or a price decrease.

11. The method of claim 1, wherein transmitting the notification comprises one or more of transmitting an electronic mail, transmitting a short message service message, or transmitting an alert on an audio/visual display interface.

12. The method of claim 1, wherein:
    the media article comprises at least one of a digital video disc, a Blu-Ray disc, or a video game;
    the media selection comprises at least one of a video on demand, a streaming video, a downloadable video, a streaming video game, or a downloadable video game;
    the theatrical media release comprises at least one of a theatrical film or a theatrical film preview trailer;
    the live content comprises a television broadcast or an internet broadcast; and
    the miscellaneous media source comprises at least one of a live performance, a television appearance, a print media article, or an internet posting.

13. The method of claim 1, wherein the customer notification subscription is stored in a customer profile database connected to the processor.

14. The method of claim 1, further comprising a crawler module in communication with the metadata database, the crawler module for obtaining the new media content.

15. The method of claim 1, further comprising a data feed connection in communication with the metadata database, the data feed connection for obtaining the new media content.

16. The method of claim 1, wherein the transaction offer comprises one or more of a reservation offer, a pre-reservation offer, a viewing offer, or a purchase offer.

17. The method of claim 1, further comprising receiving a transaction request in response to the transaction offer, the transaction request comprising a request to access at least one of the media article, the media selection, the theatrical media release, or the miscellaneous media source.

18. A non-transitory computer readable medium for generating a notification related to new media content, a type of the new media content comprising one or more of a media article for being available at an article dispensing machine, a media selection, a theatrical media release, live content, or a miscellaneous media source, the computer readable medium comprising:
    a first code segment for receiving a customer notification subscription comprising a notification request to monitor for the new media content based on metadata of the new media content, wherein the metadata of the new media content are stored in a metadata database connected to a processor;
    a second code segment for detecting the new media content based on the customer notification subscription; by accessing a third-party content provider asset management system;
    when the new media content is detected:
    a third code segment for determining the type of the new media content; a fourth code segment for determining an access right to the new media content based on:
       determining whether a subscription package corresponding to a customer includes the new media content,
       determined the type of the new media content, and
       querying an inventory database connected to the processor to determine a stock status of the new media content at the article dispensing machine; and
    a fifth code segment for transmitting the notification of the new media content based on the access right, the notification comprising a transaction offer related to the new media content and the stock status of the new media content at the article dispensing machine.

19. The non-transitory computer readable medium of claim 18, wherein the metadata database comprises the metadata of the new media content, and the metadata of the new media content comprises at least one of a release date, a running time, chapter information, technical details, a format, a peripheral device requirement, number of players, online capability, an actor, a voice actor, a director, a studio, a publisher, a developer, a platform, availability of downloadable content, episode information, a genre, a critic rating, an individualized rating, a parental rating, a description, related content, media artwork, a media still, or a proprietary identification code.

20. The non-transitory computer readable medium of claim 18, wherein the new media content comprises a change in a stock status, the stock status comprising one or more of in-stock, out-of-stock, coming soon into stock, or leaving soon from stock.

21. The non-transitory computer non-transitory readable medium of claim 18, wherein the fourth code segment for determining the access right to the new media content further comprises:
    a seventh code segment for determining a first location based on a location stored in a customer profile database connected to the processor; and
    an eighth code segment for determining a second location of the article dispensing machine closest to the first location;
    the fourth code segment for querying the inventory database comprises a ninth code segment for querying the inventory database to determine the stock status of the media article at the second location of the article dispensing machine; and
    the notification further comprises the second location of the article dispensing machine.

22. The non-transitory computer readable medium of claim 18, wherein the new media content comprises a change in a viewing availability status, the viewing availability status comprising one or more of available to view, unavailable to view, coming soon to view, or leaving soon from view.

23. The non-transitory computer readable medium of claim 22, wherein:
    the fourth code segment for determining the access right to the new media content comprises:
    a tenth code segment for associating a unique customer identifier with a customer subscription at an associated content provider, wherein the customer subscription is stored in a customer profile database connected to the processor; and
    an eleventh code segment for determining the viewing availability status of the media selection based on an access permission for the media selection in the customer subscription; and
    the notification further comprises the media selection and the viewing availability status of the media selection.

24. The non-transitory computer readable medium of claim 22, wherein:
    the fourth code segment for determining the access right to the new media content comprises a twelfth code segment for determining the viewing availability status of the theatrical media release based on a release date of the theatrical media release; and
    the notification further comprises the theatrical media release and the viewing availability status of the theatrical media release.

25. The non-transitory computer readable medium of claim 22, wherein:
    the fourth code segment for determining the access right to the new media content comprises a thirteenth code segment for determining the viewing availability status of the miscellaneous media source; and
    the notification further comprises the miscellaneous media source and the viewing availability status of the miscellaneous media source.

26. The non-transitory computer readable medium of claim 25, wherein:
    the fourth code segment for determining the access right to the new media content further comprises:
    a fourteenth code segment for determining a third location based on a location stored in a customer profile database connected to the processor; and
    a fifteenth code segment for determining a fourth location of the miscellaneous media source within a proximity limit around the third location; and
    the notification further comprises the fourth location.

27. The non-transitory computer readable medium of claim 18, wherein the new media content comprises a change in a price status, the price status comprising one or more of a price increase or a price decrease.

28. The non-transitory computer readable medium of claim 18, wherein the fifth code segment for transmitting the notification comprises a sixteenth code segment for one or more of transmitting an electronic mail, transmitting a short message service message, or transmitting an alert on an audio/visual display interface.

29. The non-transitory computer readable medium of claim 18, wherein:
    the media article comprises at least one of a digital video disc, a Blu-Ray disc, or a video game;
    the media selection comprises at least one of a video on demand, a streaming video, a downloadable video, a streaming video game, or a downloadable video game;
    the theatrical media release comprises at least one of a theatrical film or a theatrical film preview trailer;
    the live content comprises a television broadcast or an internet broadcast; and
    the miscellaneous media source comprises at least one of a live performance, a television appearance, a print media article, or an internet posting.

30. The non-transitory computer readable medium of claim 18, wherein the customer notification subscription is stored in a customer profile database connected to the processor.

31. The non-transitory computer readable medium of claim 18, further comprising a seventeenth code segment comprising a crawler module in communication with the metadata database, the crawler module for obtaining the new media content.

32. The non-transitory computer readable medium of claim 18, further comprising an eighteenth code segment comprising a data feed connection in communication with the metadata database, the data feed connection for obtaining the new media content.

33. The non-transitory computer readable medium of claim 18, wherein the transaction offer comprises one or more of a reservation offer, a pre-reservation offer, a viewing offer, or a purchase offer.

34. The non-transitory computer readable medium of claim 18, further comprising a nineteenth code segment for receiving a transaction request in response to the transaction offer, the transaction request comprising a request to access at least one of the media article, the media selection, the theatrical media release, or the miscellaneous media source.

* * * * *